United States Patent
Chen et al.

(10) Patent No.: US 11,915,501 B2
(45) Date of Patent: Feb. 27, 2024

(54) OBJECT DETECTION METHOD AND APPARATUS, ELECTRONIC DEVICE, AND STORAGE MEDIUM

(71) Applicant: Tencent Technology (Shenzhen) Company Limited, Shenzhen (CN)

(72) Inventors: Yi Lun Chen, Shenzhen (CN); Shu Liu, Shenzhen (CN); Xiao Yong Shen, Shenzhen (CN); Yu Wing Tai, Shenzhen (CN); Jia Ya Jia, Shenzhen (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 401 days.

(21) Appl. No.: 17/332,569

(22) Filed: May 27, 2021

(65) Prior Publication Data
US 2021/0287037 A1   Sep. 16, 2021

Related U.S. Application Data

(63) Continuation of application No. PCT/CN2020/078372, filed on Mar. 9, 2020.

(30) Foreign Application Priority Data

Apr. 11, 2019 (CN) .......................... 201910290188.0

(51) Int. Cl.
*G06V 20/64* (2022.01)
*G06F 18/214* (2023.01)
(Continued)

(52) U.S. Cl.
CPC ............ *G06V 20/64* (2022.01); *G06F 18/214* (2023.01); *G06N 3/045* (2023.01); *G06V 10/454* (2022.01);
(Continued)

(58) Field of Classification Search
CPC ........ G06F 18/214; G06N 3/045; G06N 3/08; G06T 2207/10004; G06T 2207/10024;
(Continued)

(56) References Cited

U.S. PATENT DOCUMENTS

| | | | |
|---|---|---|---|
| 10,970,518 B1* | 4/2021 | Zhou | .......................... G06T 7/73 |
| 2013/0246020 A1 | 9/2013 | Zeng | |
| 2019/0108639 A1* | 4/2019 | Tchapmi | .................... G06T 7/10 |

FOREIGN PATENT DOCUMENTS

| | | |
|---|---|---|
| CN | 107092859 A | 8/2017 |
| CN | 108171217 A | 6/2018 |

(Continued)

OTHER PUBLICATIONS

Office Action for Japan Application No. 2021-536821 dated Jun. 20, 2022 (English and Japanese languages) (7 pages).
(Continued)

*Primary Examiner* — Ruiping Li
(74) *Attorney, Agent, or Firm* — Crowell & Moring LLP

(57) ABSTRACT

An object detection method and apparatus include obtaining a point cloud of a scene that includes location information of points. The point cloud is mapped to a 3D voxel representation. A convolution operation is performed on the feature information of the 3D voxel to obtain a convolution feature set and initial positioning information of a candidate object region is determined based on the convolution feature set. A target point is located in the candidate object region in the point cloud is determined and the initial positioning information of the candidate object region is adjusted based on the location information and target convolution feature information of the target point. Positioning information of a target object region is obtained to improve object detection accuracy.

25 Claims, 8 Drawing Sheets

(51) Int. Cl.
  *G06N 3/045* (2023.01)
  *G06V 10/44* (2022.01)
  *G06V 10/764* (2022.01)
  *G06V 10/82* (2022.01)
  *G06V 20/56* (2022.01)
(52) U.S. Cl.
  CPC ............ *G06V 10/764* (2022.01); *G06V 10/82* (2022.01); *G06V 20/56* (2022.01); *G06V 20/647* (2022.01)
(58) Field of Classification Search
  CPC . G06T 2207/10028; G06T 2207/10032; G06T 2207/20076; G06T 2207/20081; G06T 2207/20084; G06T 2207/30252; G06T 7/73; G06T 7/77; G06V 10/454; G06V 10/764; G06V 10/82; G06V 20/56; G06V 20/64; G06V 20/647
  See application file for complete search history.

(56) References Cited

FOREIGN PATENT DOCUMENTS

| | | |
|---|---|---|
| CN | 108268878 A | 7/2018 |
| CN | 109118564 A | 1/2019 |
| CN | 109345510 A | 2/2019 |
| CN | 110059608 A | 7/2019 |
| EP | 3 462 373 A1 | 4/2019 |
| WO | WO 2018/039380 A1 | 3/2018 |

OTHER PUBLICATIONS

Yang, Zetong et al., "IPOD: Intensive Point-based Object Detector for Point Cloud", arXiv, United States of America, Cornell University, Dec. 13, 2018, pp. 1-9, https://arxiv.org/abs/1812.05276 (9 pp.).
Zhou, Yin et al., "VoxelNet: End-to-End Learning for Point Cloud Based 3D Object Detection", 2018 IEEE/CVF Conference on Computer Visionand Pattern Recognition, United States of America, IEEE, Jun. 18, 2018, pp. 4490-4499 (11 pp.).
Tchapmi, Lyne P. et al., "SEGCloud: Semantic Segmentation of 3D Point Clouds", 2017 International Conference on 3D Vision (3DV), United Staes of America, IEEE, Oct. 10, 2017, pp. 537-547 (12 pp.).
Extended European Search Report for Application No. EP 20788613.6 dated May 2, 2022 (9 pages).
Zhou, Yin et al., "VoxelNet: End-to-End Learning for Point Cloud Based 3D Object Detection," 2018 IEEE/CVF Conference on Computer Vision and Pattern Recognition, Jun. 18, 2018, pp. 4490-4499 (10 pp.).
Yang, Bin et al., "Pixor: Real-Time 3D Object Detection from Point Clouds," 2018 IEEE/CVF Conference on Computer Vision and Pattern Recognition, IEEE, Jun. 18, 2018, pp. 7652-7660 (9 pp.).
Qi, Charles R. et al., "Frustum PointNets for 3D Object Detection from RGB-D Data," Proceeding of the IEEE Conference on Computer Vision and Pattern Recognition (CVPR), IEEE, Apr. 13, 2018, pp. 978-927 (10 pp.).
Tchapmi, Lyne P. et al., SEGCloud: Semantic Segmentation of 3D Point Clouds, 2017 International Conference on 3D Vision (3DV), IEEE, Oct. 10, 2017, pp. 537-547 (11 pp.).
Search Report from the China State Intellectual Property Office for Application No. CN 201910290188.0 dated Mar. 22, 2021 (only Chinese language), (13 pages).
International Search Report and Written Opinion received for Applciaton No. PCT/CN2020/078372 dated Jun. 4, 2020 (English and Chinese languages), (10 pages).
Korean Office Action with English Translation, dated Jun. 8, 2023, pp. 1-12, issued in Korean Patent Application No. 10-2021-7024536, Korean Intellectual Property Office, Daejeon, Republic of Korea.

* cited by examiner

OBJECT DETECTION METHOD AND APPARATUS, ELECTRONIC DEVICE, AND STORAGE MEDIUM

RELATED APPLICATIONS

This application is a continuation application of PCT App. No. PCT/CN2020/078372, filed on Mar. 9, 2020, entitled "OBJECT DETECTION METHOD AND APPARATUS, ELECTRONIC DEVICE, AND STORAGE MEDIUM", which claims priority to Chinese Patent Application No. 201910290188.0, filed with the China National Intellectual Property Administration on Apr. 11, 2019 and entitled "OBJECT DETECTION METHOD AND APPARATUS, ELECTRONIC DEVICE, AND STORAGE MEDIUM", both of which are incorporated herein by reference in their entirety.

FIELD OF THE TECHNOLOGY

This application relates to the field of artificial intelligence (AI), and in particular, to an object detection technology.

BACKGROUND OF THE DISCLOSURE

Object detection is to determine a location, a category, and the like of an object in a scene. Currently, an object detection technology has been widely applied to various scenarios such as autonomous driving and unmanned aerial vehicle. Current object detection solutions are mainly to acquire a scene image, extract features from the scene image, and then determine a location and a category of an object in the scene image based on the extracted features. However, current target object detection solutions may have relatively low object detection accuracy, especially in a three dimensional ("3D") object detection scenario.

SUMMARY

Embodiments of this application provide an object detection method and apparatus, an electronic device, and a storage medium, to improve object detection accuracy.

An embodiment of this application provides an object detection method, including:
  obtaining a point cloud of a scene, the point cloud including location information of points;
  mapping the point cloud to a three-dimensional (3D) voxel representation, to obtain feature information of a 3D voxel;
  performing a convolution operation on the feature information of the 3D voxel to obtain a convolution feature set;
  determining initial positioning information of a candidate object region based on the convolution feature set;
  determining a target point located in the candidate object region in the point cloud; and
  adjusting the initial positioning information of the candidate object region based on location information and target convolution feature information of the target point, to obtain positioning information of a target object region, the target convolution feature information being convolution feature information corresponding to a location of the target point in the convolution feature set.

Correspondingly, an embodiment of this application further provides an object detection apparatus, including:

a point cloud obtaining unit, configured to obtain a point cloud of a scene, the point cloud including location information of points;
  a voxel mapping unit, configured to map the point cloud to a 3D voxel representation, to obtain feature information of a 3D voxel;
  a convolution unit, configured to perform a convolution operation on the feature information of the 3D voxel to obtain a convolution feature set;
  a candidate region obtaining unit, configured to determine initial positioning information of a candidate object region based on the convolution feature set;
  a selection unit, configured to determine a target point located in the candidate object region in the point cloud; and
  an adjustment unit, configured to adjust the initial positioning information of the candidate object region based on location information and target convolution feature information of the target point, to obtain positioning information of a target object region, the target convolution feature information being convolution feature information corresponding to a location of the target point in the convolution feature set.

In addition, an embodiment of this application further provides a storage medium, storing a plurality of instructions, the instructions being suitable for being loaded by a processor, to perform the operations of any object detection method according to the embodiments of this application.

In addition, an embodiment of this application further provides an electronic device, including a memory and a processor, the memory storing a plurality of instructions, the processor loading the instructions in the memory to perform the operations of any object detection method according to the embodiments of this application.

In addition, an embodiment of this application further provides a computer program product including instructions, the instructions, when run on a computer, causing the computer to perform the operations of any object detection method according to the embodiments of this application.

According to the embodiments of this application, a point cloud of a scene may be obtained, the point cloud including location information of points; the point cloud is mapped to a 3D voxel representation, to obtain feature information of a 3D voxel; a convolution operation is performed on the feature information of the 3D voxel to obtain a convolution feature set; initial positioning information of a candidate object region is determined based on the convolution feature set; a target point located in the candidate object region in the point cloud is determined; and the initial positioning information of the candidate object region is adjusted based on location information and target convolution feature information of the target point, to obtain positioning information of a target object region, the target convolution feature information being convolution feature information corresponding to a location of the target point in the convolution feature set. This solution may use point cloud data of a scene to perform object detection, and location information and convolution features of a point cloud are fused, to minimize the loss of positioning information, thereby effectively improving object detection accuracy. This solution is especially suitable for 3D object detection.

BRIEF DESCRIPTION OF THE DRAWINGS

To describe the technical solutions in the embodiments of this application more clearly, the following briefly describes accompanying drawings required for describing the embodiments. Apparently, the accompanying drawings in the following descriptions show merely some embodiments of this application, and a person skilled in the art may still derive other accompanying drawings from these accompanying drawings without creative efforts.

DESCRIPTION OF EMBODIMENTS

The technical solutions in the embodiments of this application are clearly and completely described in the following with reference to the accompanying drawings in the embodiments of this application. Apparently, the described embodiments are merely some rather than all of the embodiments of this application. All other embodiments obtained by a person skilled in the art based on the embodiments of this application without creative efforts shall fall within the protection scope of this application.

The embodiments of this application provide an object detection method and apparatus, an electronic device, and a storage medium. The object detection apparatus may be integrated in an electronic device such as a network device. The electronic device may be a server, a terminal, or another device such as an in-vehicle device or a micro processing box.

The object detection is to determine or recognize a location, a category, and the like of an object in a scene, for example, to recognize a category and a location of an object in a road scene, for example, a street lamp or a vehicle and a location thereof.

Figure 1A:
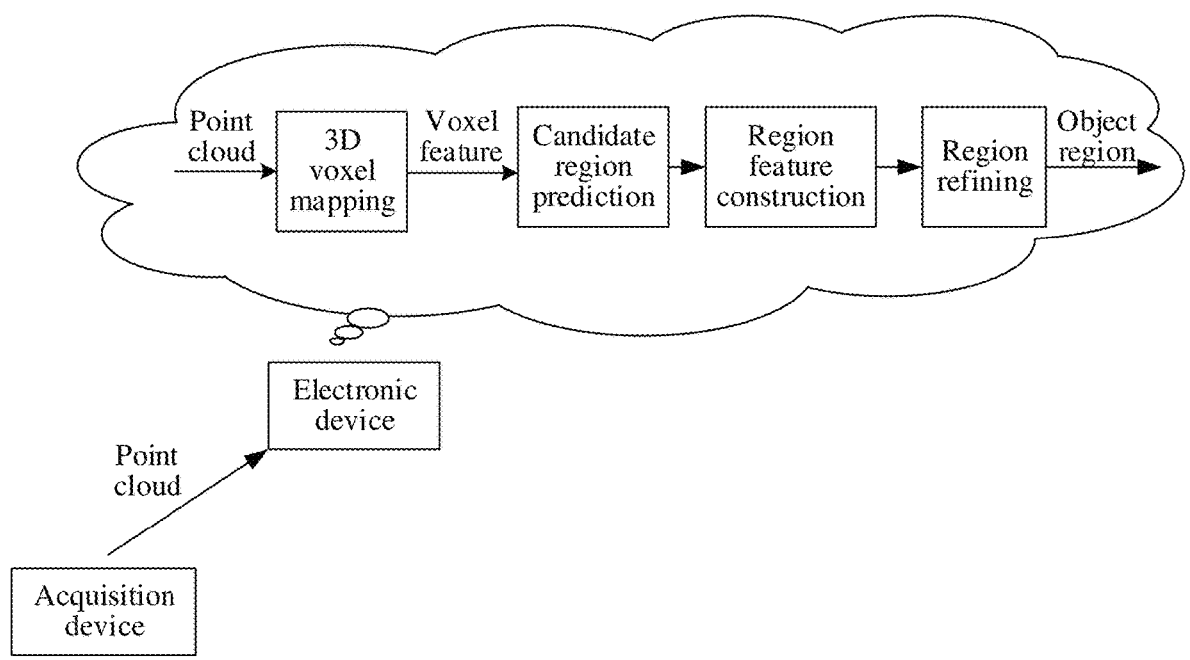
FIG. 1a is a schematic diagram of a scenario of an object detection method according to an embodiment of this application.

Referring to FIG. 1a, an embodiment of this application provides an object detection system, including an electronic device and an acquisition device. The electronic device is in communication with the acquisition device, for example, by using a wired or wireless network. In an embodiment, the electronic device and the acquisition device may be integrated in one device.

The acquisition device is configured to acquire point cloud data or image data of a scene. In an embodiment, the acquisition device may upload the acquired point cloud data to the electronic device for processing. The point cloud data may include location information of points.

The electronic device is configured to perform object detection. In one embodiment, after obtaining a point cloud of a scene uploaded by the acquisition device, the electronic device may map the point cloud to a 3D voxel representation, to obtain feature information of a 3D voxel; perform a convolution operation on the feature information of the 3D voxel to obtain a convolution feature set; determine initial positioning information of a candidate object region based on the convolution feature set; determines a target point located in the candidate object region in the point cloud; and adjust the initial positioning information of the candidate object region based on location information and target convolution feature information of the target point, to obtain positioning information of a target object region, the target convolution feature information being convolution feature information corresponding to a location of the target point in the convolution feature set.

During actual application, after obtaining positioning information of a target object detection region, a detected object may be marked in a scene image according to the positioning information. For example, the detected object is box-selected in the image in a detection box manner. In an embodiment, a category of the detected object may be marked in the scene image.

Detailed descriptions are separately provided below. The description order of the following embodiments is not intended to limit a preference order of the embodiments.

This embodiment is described from the perspective of the object detection apparatus. The object detection apparatus may be integrated in an electronic device or a network device, and the network device may be a server, a terminal, or another device. The terminal may include a mobile phone, a tablet computer, a notebook computer, a personal computer (PC), an in-vehicle device, a micro processing terminal, or the like.

Figure 1B:
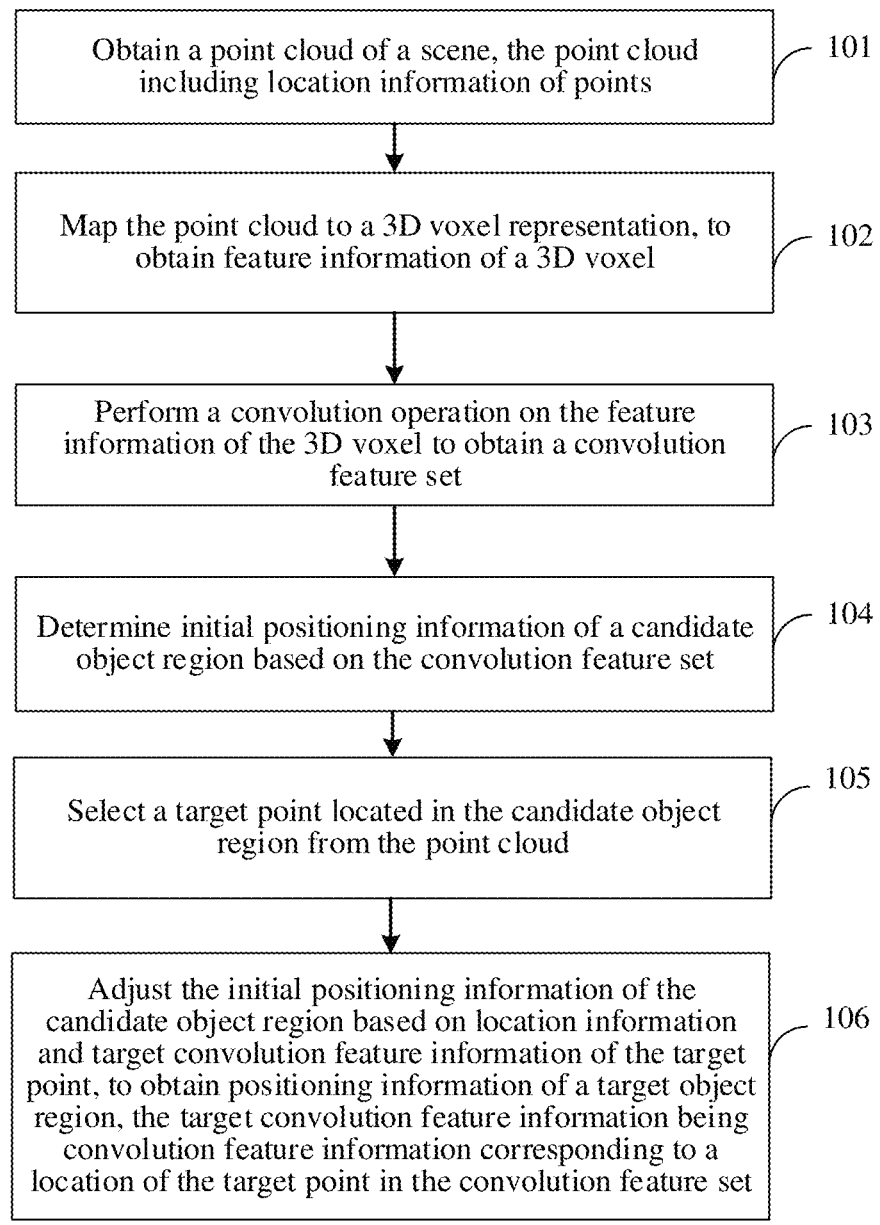
FIG. 1b is a flowchart of an object detection method according to an embodiment of this application.

An embodiment of this application provides an object detection method. The method may be performed by a processor of an electronic device. As shown in FIG. 1b, an example procedure of the object detection method may be as follows:

101. Obtain a point cloud of a scene, the point cloud including location information of points.

The point cloud is a set of points representing a scene and/or including target surface characteristics of the scene and/or target. The points in the point cloud may include location information such as 3D coordinates of the points. In addition, color information (RGB) or reflection intensity information may be further included.

For example, in an embodiment, the point cloud may include location information of a point and reflection intensity information of the point. The location information may include 3D coordinates (x, y, and z) of the point in a 3D spatial coordinate system. For example, during actual application, the point cloud may include 3D coordinates and reflection intensities of points. The point cloud may be represented by using an n×4 vector. n is the number of points in the point cloud. Each point corresponds to a 1*4 four-dimensional (4D) vector, and four dimensions of the vector respectively correspond to the 3D coordinates and the reflection intensity.

The point cloud may be obtained through detection by using a laser measurement principle or a photogrammetric principle. For example, a point cloud of an object may be obtained through scanning by using a laser scanner or a photographic scanner. A principle that a point cloud is detected by using a laser is that: when a laser beam is irradiated on a surface of an object, the reflected laser carries information such as a position and a distance. If the laser beam is scanned along a track, reflected laser point information is scanned and recorded. A large number of laser points can be obtained since the scanning is very fine, thereby forming a laser point cloud. A format of the point cloud may be *.las, *.pcd, *.txt, or the like.

For example, point cloud data of a scene may be acquired through light detection and ranging (LiDAR). LiDAR is to perform airborne laser scanning by using the Global Positioning System (GPS) and an inertial measurement unit (IMU). The measured data is represented by using discrete points of a digital surface model (DSM), and the data includes spatial 3D information and laser intensity information. An application classification technology removes measurement points such as buildings, artifacts, and cover plant in these raw DSMs, to obtain a digital elevation model (DEM) and obtain heights of ground coverings.

In the embodiments of this application, the point cloud data of the scene may be acquired by the electronic device. For example, the electronic device may detect and measure the point cloud data by using a laser. The point cloud data of the scene may be alternatively acquired by another device, and the electronic device then obtains the point cloud data from the another device or found from an online database. For example, a LiDAR sensor acquires the point cloud data, and the electronic device obtains the point cloud data from the sensor.

There may be a plurality of application scenarios. For example, this solution may be applied to a road scenario in autonomous driving, an aerial scenario in unmanned aerial vehicle flight, or the like.

102. Map the point cloud to a 3D voxel representation, to obtain feature information of a 3D voxel.

After obtaining the point cloud of the scene, the point cloud (for example, an n×4 vector) of the entire scene may be mapped to a 3D voxel representation. That is, the point cloud of the scene is voxelized.

A process of mapping the point cloud to a 3D voxel representation may include: constructing a voxel block (for example, a cubic voxel block) of a corresponding size based on a range of the point cloud of the scene; dividing the voxel block to obtain a plurality of 3D voxels; mapping the point cloud of the scene to the 3D voxels; and constructing feature information of the 3D voxels based on location information of mapping points in the 3D voxels.

The range of the point cloud of the scene may include a range of the point cloud or an acquisition range (for example, a range in which the sensor acquires the point cloud of the scene) of the point cloud, and the range or acquisition range of the point cloud may be marked by using a size, for example, five meters in the longitudinal direction, four meters in the transverse direction, and three meters in the vertical direction. For example, a voxel block with a same size may be constructed based on the size of the point cloud of the scene. The size of the point cloud of the scene may include the length, width, and height of the point cloud.

The voxel block may be divided in a plurality of manners. For example, the voxel block may be divided according to a predetermined size. The predetermined size is a size of a 3D voxel that needs to be obtained through division, and the size may be set according to an actual requirement. The size of the 3D voxel may include L (length)×W (width)×H (height). For example, the predetermined size of the 3D voxel may be 0.2 millimeters*0.2 millimeters*0.1 millimeters.

After obtaining the 3D voxels through division, points may be mapped to a corresponding 3D voxel according to location information of the points in the point cloud.

After the mapping of the point cloud is finished, the feature information of the 3D voxel may be obtained based on the location information of the points mapped into the 3D voxel, that is, obtained based on the location information of the points in the 3D voxel. For example, the step "constructing feature information of the 3D voxels based on location information of mapping points in the 3D voxels" may include:

when there are mapping points in the 3D voxels, selecting location information of a target mapping point from the mapping points as the feature information of the 3D voxels; or when there is no mapping point in the 3D voxels, setting the feature information of the 3D voxel to zero.

An example in which the point cloud is an n×4 (3D coordinates and reflection intensities of n points) vector is used. After the point cloud is mapped, a 4D vector of a mapping point is directly selected from a voxel including mapping points as feature information of the voxel, and feature information of a voxel including no mapping point is 0.

The point cloud may be mapped to a 3D voxel representation according to the foregoing steps, and the feature information of a 3D voxel may be constructed. The feature information of the 3D voxel may include information such as location information of a mapping point in the voxel or may be zero.

103. Perform a convolution operation on the feature information of the 3D voxel to obtain a convolution feature set.

The convolution feature set includes extracted features of all 3D voxels. During actual application, the convolution feature set may be a feature map of all the 3D voxels.

For example, to improve feature extraction accuracy of a 3D voxel, a 3D convolution operation and a two-dimensional (2D) convolution operation may be performed on a feature of the 3D voxel to extract the feature.

For example, the step "performing a convolution operation on the feature information of the 3D voxel to obtain a convolution feature set" may include:

performing a 3D convolution operation on the feature information of the 3D voxel to obtain 3D convolution feature information of the 3D voxel; and performing a 2D convolution operation on the 3D convolution feature information to obtain the convolution feature set.

Figure 1C:
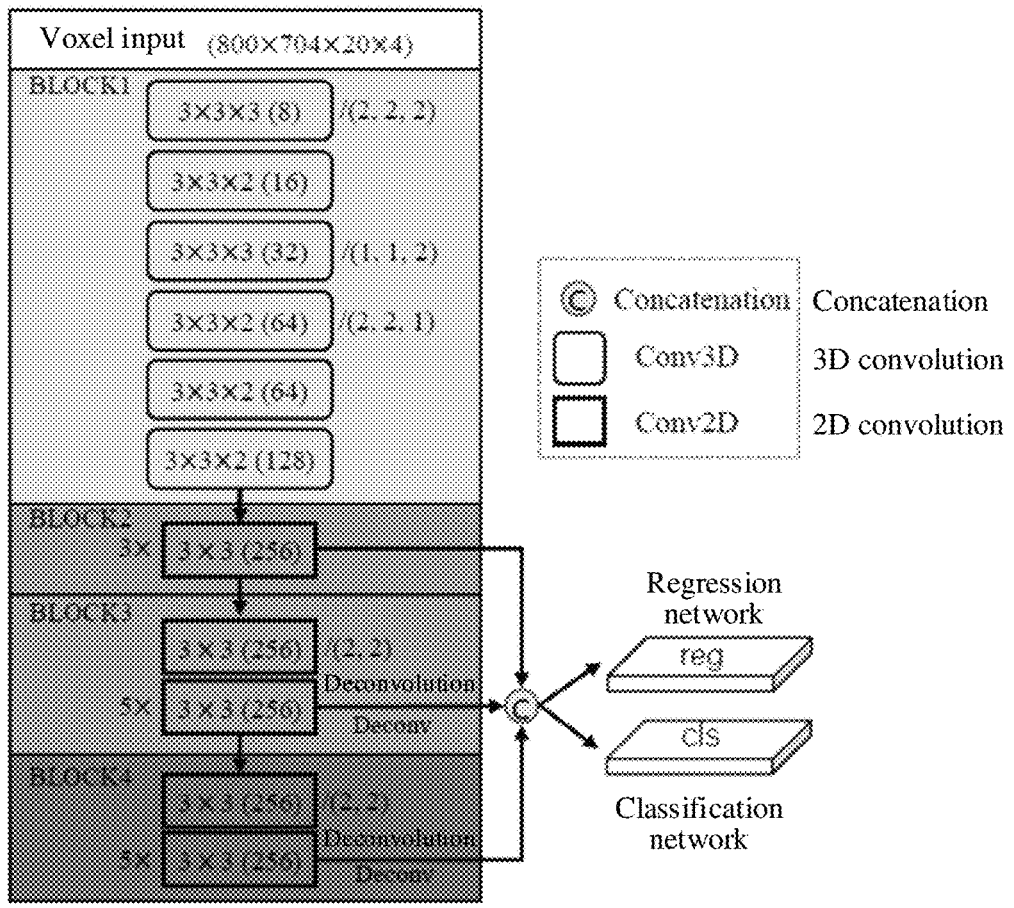
FIG. 1c is a schematic structural diagram of a VoxelRPN according to an embodiment of this application.

In an embodiment, the convolution feature set may be extracted from the feature of the 3D voxel by using a neural network such as a neural network-based region proposal network (RPN). Referring to FIG. 1c, the RPN may include: a 3D convolutional network, a 2D convolutional network, a fusion module, a regression network, and a classification network.

The 3D convolutional network is connected to the 2D convolutional network, the fusion module is connected to the 2D convolutional network, and the regression network and the classification network are connected to the fusion module.

The term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

After the feature information of the 3D voxel is obtained, in the embodiments of this application, a 3D convolution operation may be performed on the feature information of the 3D voxel by using the 3D convolutional network in the RPN. Referring to FIG. 1c, the 3D convolutional network may include one or more 3D convolution layers, and each 3D convolution layer (Conv3D) corresponds to one 3D convolution kernel such as 3×3×2 (channel quantity) or 3×3×3 (channel quantity). In one embodiment, a 3D convolution operation may be performed on the feature information of the 3D voxel sequentially by using the Conv3Ds in the 3D convolutional network.

For example, referring to FIG. 1c, the feature information of the 3D voxel may be used as an input of a network and inputted into the network. A first 3D convolution layer performs a 3D convolution operation on the feature information of the 3D voxel by using a 3×3×2 (8) 3D convolution kernel, and inputs a convolution operation result into a second 3D convolution layer to perform a 3D convolution operation of which a 3D convolution kernel is 3×3×2 (16). The rest is deduced by analogy until the last 3D convolution layer in the 3D convolutional network performs a 3D convolution operation on inputted features by using a 3×3×2 (128) convolution kernel.

After the 3D convolution feature information is obtained by performing 3D feature extraction on the feature information of the 3D voxel by using the 3D convolutional network, a 2D convolution operation may be performed on the 3D convolution feature information by using the 2D convolutional network in the RPN, to extract 2D convolution features, to obtain the convolution feature set.

For example, referring to FIG. 1c, the 2D convolutional network may include a plurality of convolutional blocks sequentially connected, and each convolutional block includes one or more 2D convolution layers (Conv2Ds). After the 3D convolutional network finishes the 3D convolution operation, a 2D convolution operation may be performed on the 3D convolution feature information sequentially by using the plurality of convolutional blocks in the 2D convolutional network; and convolution features outputted by the convolutional blocks are fused by using the fusion module, to obtain the convolution feature set.

Referring to FIG. 1c, an example in which the 2D convolutional network includes three convolutional blocks is used. Each 2D convolutional block, for example, a BLOCK2, a BLOCK3, or a BLOCK4, may include one or more 2D convolution layers. For example, the BLOCK2 includes three 2D convolution layers of which a convolution kernel is 3×3 (256). In one embodiment, after the 3D convolutional network finishes the extraction of the 3D convolution feature information, the extracted 3D convolution feature information may be inputted to the BLOCK2 in the 2D convolutional network, the BLOCK2 may perform a 2D convolution operation on the inputted 3D convolution feature information by using the plurality of 2D convolution layers (the convolution kernel is 3×3) in the BLOCK2 and input an outputted convolution feature into the next BLOCK3. Similarly, the BLOCK3 may perform a 2D convolution operation on the inputted feature information by using the plurality of 2D convolution layers (the convolution kernel is 3×3) in the BLOCK3 and input an outputted convolution feature into the next BLOCK4. The BLOCK4 may perform a 2D convolution operation on the inputted feature information by using the plurality of 2D convolution layers (the convolution kernel is 3×3) in the BLOCK4 and output a convolution feature.

In the embodiments of this application, after a 2D convolution operation is performed on the 3D convolution feature information sequentially by using the convolutional blocks in the 2D convolutional network, the convolution features outputted by the convolutional blocks may be fused to obtain a convolution feature set corresponding to all the 3D voxels.

In an embodiment, to improve the efficiency and accuracy of feature fusion, deconvolution processing may be further performed on the convolution features outputted by other convolutional blocks than the first convolutional block in the 2D convolutional network, so that deconvolution features of the other convolutional blocks and the convolution feature outputted by the first convolutional block are of the same size, which helps to fuse the features and improve the accuracy of fused features.

For example, the step "fusing convolution features outputted by the convolutional blocks to obtain the convolution feature set" may include:

performing deconvolution processing on the convolution features outputted by other convolutional blocks than the first convolutional block in the 2D convolutional network to obtain deconvolution features of the other convolutional blocks, the deconvolution features and the convolution feature outputted by the first convolutional block being of the same size; and fusing the convolution feature outputted by the first convolutional block and the deconvolution features of the other convolutional blocks to obtain the convolution feature set.

For example, referring to FIG. 1c, a deconvolution operation (Deconv) may be performed on the convolution features outputted by the BLOCK4 and the BLOCK3, to make deconvolution features outputted by the BLOCK4 and the BLOCK3 and the convolution feature outputted by the BLOCK2 to be of the same size, and the convolution feature outputted by the BLOCK2, the deconvolution feature outputted by the BLOCK3, and the deconvolution feature outputted by the BLOCK4 are further fused by using the fusion module.

The convolution features may be fused in a plurality of manners. For example, the convolution features may be fused in a feature concatenation manner. Referring to FIG. 1c, the convolution feature outputted by the BLOCK2, the deconvolution feature outputted by the BLOCK3, and the deconvolution feature outputted by the BLOCK4 may be concatenated, to obtain a convolution feature set (for example, a feature map).

After the feature information of the 3D voxel is obtained according to the foregoing steps, a 3D convolution operation and a 2D convolution operation may be performed on the feature information of the 3D voxel, to extract the convolution feature set corresponding to all the 3D voxels.

104. Determine initial positioning information of a candidate object region based on the convolution feature set.

The candidate object region may be a 2D region or may be a 3D region, and may be set according to an actual requirement. During actual application, when the candidate object region is marked in the form of a box, the box may be referred to as an object box, a box, or a detection box.

The initial positioning information of the candidate object region may include location information and size information of the candidate object region. The location information may be represented by using location information of a reference point in the candidate object region, and the reference point may be set according to an actual requirement. For example, a central point of the candidate object region may be set as the reference point. A 3D candidate object region is used as an example. The location information of the candidate object region may include 3D coordinates such as (x, y, z) of the central point of the candidate object region.

The size information of the candidate object region may include a size parameter of the candidate object region. For example, when the candidate object region is a 2D region, the size parameter of the candidate object region may include the length l*the width w, and when the candidate object region is a 3D region, the size parameter of the candidate object region may include the length l*the width w*the height h.

In addition, in some scenes, an orientation of the object is relatively significant reference information. Therefore, in some embodiments, the initial positioning information of the candidate object region may further include an orientation of the candidate object region. For example, the candidate object region faces forward, backward, downward, or upward. The orientation of the candidate object region can indicate an orientation of an object in the scene. During actual application, the orientation of the candidate object region may be represented based on angles. For example, two orientations may be defined and are respectively 0° and 90°.

In an embodiment, the orientation of the object may be represented by using a rotation angle, and the rotation angle is a rotation angle around a z axis (in a vertical direction).

A 3D candidate object region is used as an example. The initial positioning information of the candidate object region may include 7-dimensional (7D) parameters (or may be referred to as regression parameters) and include the coordinates (x, y, and z) of the central point of the region, a size (the length l, the width w, and the height h) of the region, and a rotation angle (theta) around the z axis (in the vertical direction).

In the embodiments of this application, the initial positioning information of the candidate object region is determined based on the convolution feature set in a plurality of manners. For example, the initial positioning information of the candidate object region may be predicted based on the convolution feature set of the 3D voxel, or the initial positioning information of the candidate object region may be predicted based on an RPN.

In an embodiment, to improve the accuracy of generation of the candidate object region such as a candidate box to further improve the accuracy of object detection, a reference object region may be preset for each 3D voxel or each point in the point cloud, and the reference object region may also be referred to as an anchor object region. During actual application, when the region may be represented by using a box, the box may be referred to as an anchor box or a reference box. Positioning offset information of the reference object region relative to an actual object region and an object category corresponding to the 3D voxel are then predicted based on the convolution feature set, and adjustment such as optimization is then performed on the reference object region such as the reference box based on the two pieces of information, to obtain the initial positioning information of the candidate object region.

In one embodiment, the step "determining initial positioning information of a candidate object region based on the convolution feature set" may include:

predicting positioning offset information and an object category corresponding to the 3D voxel based on the convolution feature set, the positioning offset information being initial positioning offset information of a reference object region corresponding to the 3D voxel relative to an actual object region; and adjusting the reference object region corresponding to the 3D voxel based on the positioning offset information and the object category to obtain the initial positioning information of the candidate object region.

The positioning offset information is initial positioning offset information of the reference object region corresponding to the 3D voxel relative to the actual object region, for example, positioning offset information of the reference box relative to a ground truth. The positioning offset information may include: location offset information (coordinate offsets of the 3D coordinates x, y, and z), size offset information (size offsets of the length, width, and height), angle offset information (for example, an angle offset of the rotation angle), and the like, such as offsets of the 7D parameters (x, y, z, h, w, l, and theta).

For example, the positioning offset information may include 7D parameters (or may be referred to as regression parameters) and include offsets of the coordinates (x, y, and z) between the central point of the reference object region and a central point of the actual object region, offsets of the sizes (l, w, and h) between the reference object region and the actual object region, and an angle offset between the rotation angle of the reference object region and a rotation angle of the actual object region around the z axis (in the vertical direction).

The reference object region corresponding to the 3D voxel may be a preset object region. For example, an object region is pre-established for the 3D voxel. In another example, a reference object region may be pre-established for each point in the point cloud. After the points in the point cloud are mapped to the 3D voxel, the reference object region corresponding to the 3D voxel may be a reference object region of mapping points in the voxel, for example, may be a reference object region of feature points in the 3D voxel.

Information such as the size of the reference object region may be set according to an actual requirement when the reference object region is preset.

In the embodiments of this application, to improve the accuracy of generation of the candidate object region, the positioning offset information and the object category may be further predicted by using a deep learning network. For example, the object category and the positioning offset information may be respectively predicted by using a classification network and a regression network that are based on deep learning.

In an embodiment, to improve the efficiency, the classification network and the regression network may be alternatively integrated in the RPN. That is, the RPN may alternatively include the classification network and the regression network. For example, after the fusion module fuses the convolution features outputted by the convolutional blocks to obtain the convolution feature set in the RPN, object classification may be performed on the 3D voxel based on the classification network and the convolution feature set to obtain the object category corresponding to the 3D voxel; and the positioning offset information corresponding to the 3D voxel may be predicted based on the regression network and the convolution feature set.

For example, referring to FIG. 1c, the fusion module fuses the convolution features outputted by the convolutional blocks in the 2D convolutional network to obtain the convolution feature set. The convolution feature set is then inputted into the regression network (reg) and the classification network (cls). The regression network may predict the positioning offset information of the reference object region corresponding to the 3D voxel relative to the actual object region based on the convolution feature set. The classification network may predict the object category corresponding to the 3D voxel based on the convolution feature set.

The regression network (reg) and the classification network (cls) may be formed by one or more fully connected (FC) layers.

In the embodiments of this application, after the positioning offset information and the object category are predicted, optimization adjustment may be performed on the reference object region corresponding to the 3D voxel based on the predicted positioning offset information and object category. For example, the reference object region corresponding to the 3D voxel may be screened based on the object category, and the remaining object region after the screening may be corrected based on the positioning offset information.

For example, the step "adjusting the reference object region corresponding to the 3D voxel based on the positioning offset information and the object category to obtain the initial positioning information of the candidate object region" may include:

screening the reference object region according to the object category to obtain a screened object region; and correcting positioning information of the screened object region based on positioning offset information of the screened object region to obtain the initial positioning information of the candidate object region.

For example, a region of which the object category is a preset category may be selected from the reference object regions, or a region of a preset category may be screened out.

The positioning information may be corrected in a plurality of manners. For example, when the positioning information of the screened object region includes 7D regression parameters such as (x, y, z, h, w, l, and theta), the original 7D regression parameters of the reference object region and offsets of the parameters may be added, and the 7D regression parameters obtained after addition are used as initial 7D regression parameters of the candidate object region, that is, the initial positioning information of the candidate object region.

In the embodiments of this application, the initial positioning information, for example, the 7D regression parameters (x, y, z, h, w, l, and theta) of the candidate object region, may be obtained or predicted according to the foregoing manners.

105. Determine a target point located in the candidate object region in the point cloud.

After the candidate object region is determined, a target point located in the candidate object region may be selected from the point cloud. In one embodiment, the target point located in the candidate object region may be determined according to the location information (for example, the 3D coordinates) of the points in the point cloud and the initial positioning information (for example, the 3D coordinates and the size) of the candidate object region.

During actual application, a point located in the candidate object region such as a candidate box may be obtained through cropping from the point cloud.

106. Adjust the initial positioning information of the candidate object region based on location information and target convolution feature information of the target point, to obtain positioning information of a target object region, the target convolution feature information being convolution feature information corresponding to a location or position of the target point in the convolution feature set.

After selecting the target point located in the candidate object region, location information of the target point may be obtained and convolution feature information corresponding to a location of the target point may be obtained from the convolution feature set. For example, the points in the point cloud are mapped to the 3D voxel, so that a 3D voxel to which the target point is mapped may be determined according to the location information of the target point, to extract the convolution feature information corresponding to the 3D voxel from the convolution feature set. In the embodiments of this application, the two parts of information may be used as feature information to correct the initial positioning information of the candidate object region.

There may be a plurality of manners of adjusting the initial positioning information of the candidate object region based on the location information and the target convolution feature information of the target point. For example, a positioning offset of the candidate object region may be predicted based on the two types of information, and the initial positioning information of the candidate object region may then be corrected based on the positioning offset. Alternatively, the positioning information of the candidate object region is directly predicted based on the two types of information.

A target object region is an object region that is eventually outputted, which may be a candidate object region of which the initial positioning information is corrected.

In an embodiment, the step "adjusting the initial positioning information of the candidate object region based on location information and target convolution feature information of the target point, to obtain positioning information of a target object region" includes:

(1) Fuse the location information and the target convolution feature information of the target point to obtain region feature information of the candidate object region.

The location information and the convolution feature information may be fused in a plurality of manners. For example, in an embodiment, to avoid feature loss, a feature weight of the target point may be calculated based on the target convolution feature information, and a location feature of the target point is then adjusted based on the weight to obtain the region feature information of the candidate object region.

In one embodiment, the step "fusing the location information and the target convolution feature information of the target point to obtain region feature information of the candidate object region" may include:

fusing the location information and the target convolution feature information of the target point to obtain fused feature information, where for example, concatenation may be performed on the location information and the target convolution feature information of the target point to obtain the fused feature information;

performing dimension reduction on the target convolution feature information of the target point to obtain a feature weight of the target point;

performing feature weighting on the fused feature information based on the feature weight to obtain weighted feature information, where for example, when the feature weight is an n×1 feature weight vector, n is the number of the target points, and the fused feature information includes an n×256 fused feature vector, the n×1 feature weight vector and the n×256 fused feature vector may be multiplied, that is, feature weighting is performed through element-wise multiplication; and performing a downsampling operation on the weighted feature information to obtain the region feature information of the candidate object region, where for example, a maxpooling operation is performed.

In an embodiment, to facilitate fusion and improve the accuracy of features, feature dimensions of the fused feature information may be further raised and then processed based on the feature weight. For example, the step "performing feature weighting on the fused feature information based on the feature weight to obtain weighted feature information" may include:

performing dimension raising on feature dimensions of the fused feature information to obtain processed feature information; and performing feature weighting on the processed feature information based on the feature weight to obtain the weighted feature information.

In an embodiment, to increase nonlinearity of features, an activation function may be further added in the process of determining a feature weight. For example, the step "performing dimension reduction on the target convolution feature information to obtain a feature weight of the target point" may include:

performing dimension reduction on the target convolution feature information to obtain an initial feature weight; and processing the initial feature weight based on an activation function to obtain the feature weight of the target point.

The activation function may be a function such as a Sigmoid function.

To improve object detection efficiency and accuracy, fusion of the location information and the target convolution feature information of the target point may be alternatively implemented by using a deep learning network, to construct the region feature information of the candidate object region. The raising and reduction of the feature dimensions may be both implemented by using an FC layer, for example, may be implemented by using a fully convolutional network (FCN).

Figure 1D:
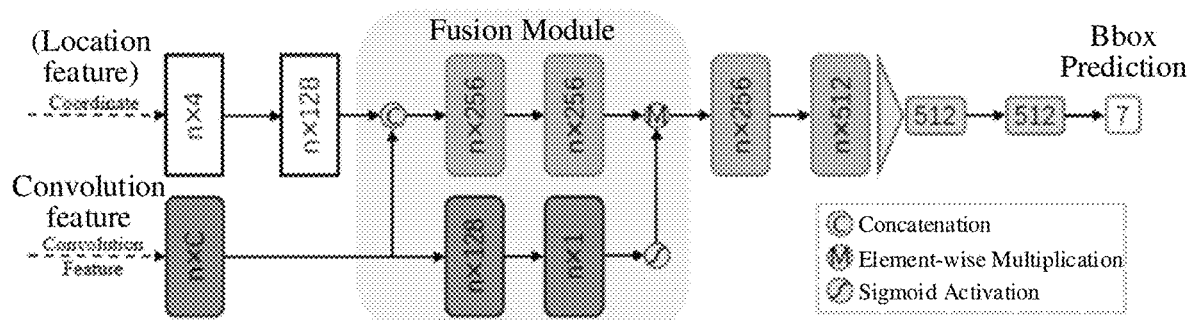
FIG. 1d is a schematic structural diagram of a RefinerNet according to an embodiment of this application.

For example, referring to FIG. 1d, a region refiner network (RefinerNet) is provided, including a plurality of FC layers, a fusion module, and a downsampling module. The fusion module includes a feature concatenation module, that is, a "C" module in the figure, a group of FC layers that are connected in parallel, an activation module, and an element-wise multiplication module, that is, an "M" module.

After the initial positioning information of the candidate object region is obtained, the target point located in the candidate object region may be obtained through cropping from the point cloud, and the location information, for example, coordinates of the target point is used as an n×4 location feature vector (n is the number of target points). In addition, the convolution feature information, for example, an n×C feature vector corresponding to the location of the target point is extracted from the convolution feature set such as a feature map, and the location feature vector and the convolution feature information are then inputted into the region RefinerNet separately.

The FC layers in the region RefinerNet map the n×4 location feature vector into an n×128 location feature vector and then input the n×128 location feature vector into the fusion module. The feature concatenation module, that is, the "C" module, in the fusion module may fuse the n×C convolution feature vector and the mapped n×128 location feature vector, and map the fused feature vector into an n×256 fused feature vector by using two FC layers. In addition, the fusion module maps the n×C convolution feature vector into an n×1 convolution feature vector (that is, the feature weight vector of the target point) by using an n×128 FC layer and an n×1 FC layer. In addition, the activation module performs activation on the n×1 convolution feature vector by using an activation function such as a Sigmoid function, and the element-wise multiplication module, that is, the "M" module, performs element-wise multiplication on the n×1 convolution feature vector on which activation has been performed and the n×256 fused feature vector, to output a multiplied feature vector.

The multiplied feature vector is then sequentially mapped into an n×256 feature vector and an n×512 feature vector by using two FC layers. The downsampling module then performs a downsampling operation on the n×512 feature vector to obtain 512 features, and the 512 features are the region feature information of the candidate object area/region.

(2). Predict positioning offset information of the candidate object region relative to an actual object region based on the region feature information, to obtain predicted positioning offset information.

For example, the regression network may predict positioning offset information based on the region feature information. In an embodiment, to improve the efficiency, the regression network may be integrated in the region RefinerNet. For example, referring to FIG. 1d, the region RefinerNet may further include the regression network (reg). After the 512 region features are obtained through the downsampling operation, positioning offset prediction may be performed based on the regression network to obtain predicted positioning offset information. For example, the predicted positioning offset information may include: location offset information (coordinate offsets of the 3D coordinates x, y, and z), size offset information (size offsets of the length, width, and height), angle offset information (an angle offset of the rotation angle), and the like, for example, offsets of 7D parameters (x, y, z, h, w, l, and theta).

(3). Correct the initial positioning information of the candidate object region based on the predicted positioning offset information, to obtain the positioning information of the target object region.

After the predicted positioning offset information of the candidate object region is obtained, the initial positioning information of the candidate object region may be corrected based on the predicted positioning offset information, to obtain the positioning information of the target object region.

The positioning information may be corrected in a plurality of manners. For example, when the initial positioning information of the candidate object region includes 7D regression parameters such as (x, y, z, h, w, l, and theta), the original 7D regression parameters of the candidate object region and offsets of the parameters may be added, and the added 7D regression parameters are used as optimized 7D regression parameters of the candidate object region, to obtain 7D regression parameters of the target object region.

The following describes the training of the RPN and the region RefinerNet:

The RPN may be trained by using a type loss and a positioning offset loss in the embodiments of this application, and details are as follows:

(1) Obtain a training sample set, the training sample set including a sample point cloud of a sample scene.

The training sample set may include sample point clouds of a plurality of sample scenes. The sample point cloud includes location information of points and may further include reflection intensity information of the points.

During actual training, a sample object category and positioning information of an actual object region may be further marked in the sample scene. Alternatively, in an embodiment, sample offset information of a sample reference object region relative to an actual object region may be further marked. The sample reference object region may be a predetermined object region corresponding to a point in the point cloud, for example, a reference region such as a reference box established for each sample point in a spatial coordinate system of the sample scene.

(2) Map location information of points in the sample point cloud to a sample 3D voxel representation, to obtain sample feature information of a sample 3D voxel.

In one embodiment, for representation manners of the sample 3D voxel, reference may be made to the descriptions in the foregoing embodiments.

(3) Predict positioning offset information and an object category corresponding to the sample 3D voxel based on a pre-constructed RPN and the sample feature information, to obtain predicted positioning offset information and a predicted category.

In one embodiment, for a prediction process of the RPN, reference may be made to the descriptions of the foregoing embodiment and FIG. 1c.

(4) Calculate a positioning offset loss of the predicted positioning offset information relative to actual offset information and a category loss of the predicted object category relative to an actual object category.

The actual offset information may be obtained through calculation according to the positioning information of the actual object region and positioning information of the reference object region. For example, offset values ($\Delta x$, $\Delta y$, $\Delta z$, $\Delta h$, $\Delta w$, $\Delta l$, and $\Delta theta$) between 7D regression parameters (x, y, z, h, w, l, and theta) of the actual object region and the reference object region are calculated.

The positioning offset loss is an offset loss, that is, an error of the predicted positioning offset information relative to the actual offset information. In an embodiment, when the positioning information includes regression parameters of a region, the positioning offset loss may be referred to as a regression parameter loss Lreg.

For example, a loss of the training of the RPN may be as follows:

Loss=Lcls+αLreg, where Lcls is the category loss, and the Lreg is the regression parameter loss.

$$L_{cls} = \frac{1}{N_{pos}}\sum_i L_{cls}(p_i^{pos}, 1) + \frac{1}{N_{neg}}\sum_i L_{cls}(p_i^{neg}, 0), \text{ and}$$

-continued
$$L_{cls}(p, t) = -(t\log(p) + (1 - t)\log(1 - p)).$$

For example, when a region is represented by using a box, for the regression loss, offsets that need to be predicted are offsets of a reference box relative to a ground truth, which includes coordinate offsets (offsets of x, y, and z, that is, $\Delta_1 x$, $\Delta_1 y$, and $\Delta_1 z$); offsets of the length, width, and height (offsets of l, w, and h, that is, $\Delta_1 h$, $\Delta_1 w$, and $\Delta_1 l$); and an angle offset (an offset of θ, that is, $\Delta_1 \theta$), and a calculation manner is as follows:

$$\Delta_1 x = \frac{x_g - x_a}{d_a}, \Delta_1 y = \frac{y_g - y_a}{d_a}, \Delta_1 z = \frac{z_g - z_a}{h_a},$$

$$\Delta_1 h = \log\left(\frac{h_g}{h_a}\right), \Delta_1 \omega = \log\left(\frac{\omega_g}{\omega_a}\right), \Delta_1 l = \log\left(\frac{l_g}{l_a}\right),$$

$$\Delta_1 \theta = \theta_g - \theta_a.$$

A value of which a subscript is g represents a value of a ground truth, and a value of which a subscript is a represents a value of an anchor box.

(5). Train the RPN based on the positioning offset loss and the category loss, to obtain a trained RPN. The positioning offset loss and type loss can be combined to train the preset candidate area network to obtain the trained candidate area network.

In one embodiment, network parameters in the RPN may be adjusted according to the positioning offset loss and the category loss. For example, weights of the parameters may be adjusted.

According to the foregoing process, the RPN is trained by using a large amount of point cloud data of sample scenes, and an RPN with higher accuracy may be obtained by continuously adjusting the network parameters.

For training of the region RefinerNet:

The region RefinerNet is configured to perform further precise prediction on the candidate object region predicted by using the RPN in the first stage, so that the positioning offset loss used in the training of the RPN may be used as a regression parameter loss during training.

In the embodiments of this application, the region RefinerNet may be trained in a manner of training the region RefinerNet and the RPN jointly. For example, after the point cloud data of a sample scene is obtained, the point cloud data may be mapped to a 3D voxel representation and inputted into the RPN, to predict positioning offsets of the candidate region relative to a reference region (anchor region) according to the training manner of the RPN described above, and the positioning information of the reference region (anchor region) is corrected based on the positioning offset, to obtain the positioning information of the candidate region. Region feature information of the candidate region is then extracted according to the region feature formation manner described above and inputted into the region RefinerNet, to obtain predicted offset information of the candidate region based on offset information of the candidate region predicted by the region RefinerNet, calculate an offset loss of the predicted offset information relative to actual offset information, and train the region RefinerNet based on the offset loss.

The positioning offset loss is an offset loss, that is, an error of the predicted positioning offset information relative to the actual offset information. In an embodiment, when the positioning information includes regression parameters of a region, the positioning offset loss may be referred to as a regression parameter loss Lreg.

The offset information predicted by the region RefinerNet is an offset of the candidate region relative to an actual region. For example, a box-marked region is used as an example. Offsets predicted by the region RefinerNet may include, coordinate offsets (offsets of x, y, and z, that is, $\Delta_2 x$, $\Delta_2 y$, and $\Delta_2 z$); offsets of the length, width, and height (offsets of l, w, and h, that is, $\Delta_2 h$, $\Delta_2 w$, and $\Delta_2 l$); and an angle offset (an offset of θ, that is, $\Delta_2 \theta$), and a calculation manner is as follows:

$$\Delta_2 x = x_g - x_p, \Delta_2 y = y_g - y_p, \Delta_2 z = z_g - z_a, \Delta_2 h = h_g - h_a,$$
$$\Delta_2 \omega = \omega_g - \omega_a, \Delta_2 l = l_g - l_a, \text{ and } \Delta_2 \theta = \theta_g - \theta_p.$$

A value of which a subscript is g represents a value of a ground truth, a value of which a subscript is a represents a value of an anchor box, and a value of which a subscript is p represents a value of a candidate box predicted by the RPN.

As can be learned from the above, a point cloud of a scene is obtained, the point cloud including location information of points; the point cloud is mapped to a 3D voxel representation, to obtain feature information of a 3D voxel; a convolution operation is performed on the feature information of the 3D voxel to obtain a convolution feature set; initial positioning information of a candidate object region is determined based on the convolution feature set; a target point located in the candidate object region in the point cloud is determined; and the initial positioning information of the candidate object region is adjusted based on location information and target convolution feature information of the target point, to obtain positioning information of a target object region, the target convolution feature information being convolution feature information corresponding to a location of the target point in the convolution feature set. This solution may use point cloud data of a scene to perform object detection, and location information and convolution features of a point cloud are fused, to minimize the loss of positioning information, thereby effectively improving object detection accuracy and efficiency. This solution is especially suitable for 3D object detection.

In addition, the RPN and the region RefinerNet provided in this solution further have an extremely efficient running speed, which can greatly expand the practicability.

According to the method described in the foregoing embodiments, the following further provides detailed descriptions by using examples.

In this embodiment, description is made by using an example in which the object detection apparatus is integrated in an electronic device.

Figure 2A:
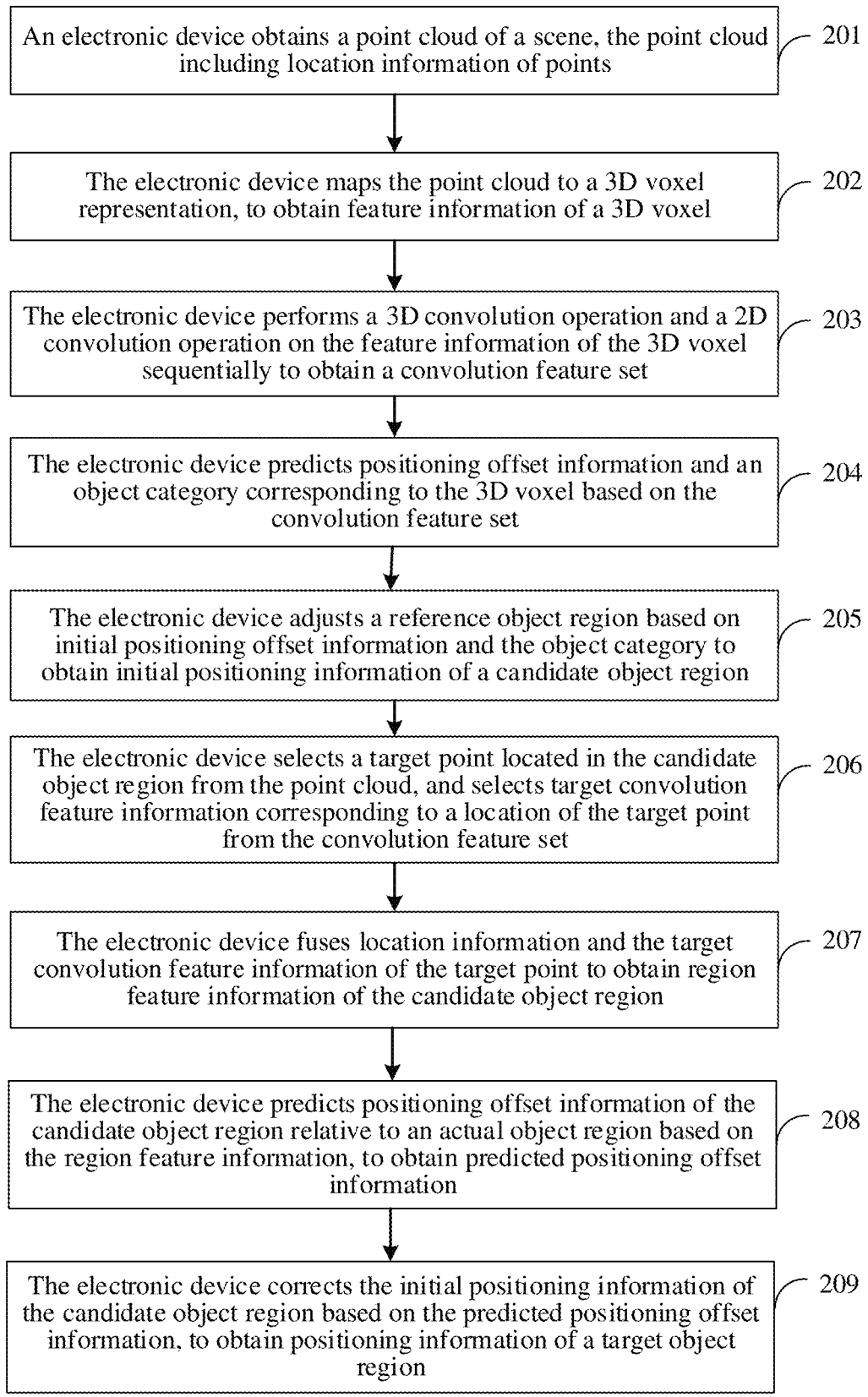
FIG. 2a is another schematic flowchart of an object detection method according to an embodiment of this application.

As shown in FIG. 2a, an example procedure of an object detection method may be as follows:

201. An electronic device obtains a point cloud of a scene, the point cloud including location information of points.

The electronic device may obtain a point cloud of a scene by using a point cloud acquisition device. The point cloud includes location information of points, and the location information of points may include 3D coordinates x, y, and z and a rotation angle.

Figure 2B:
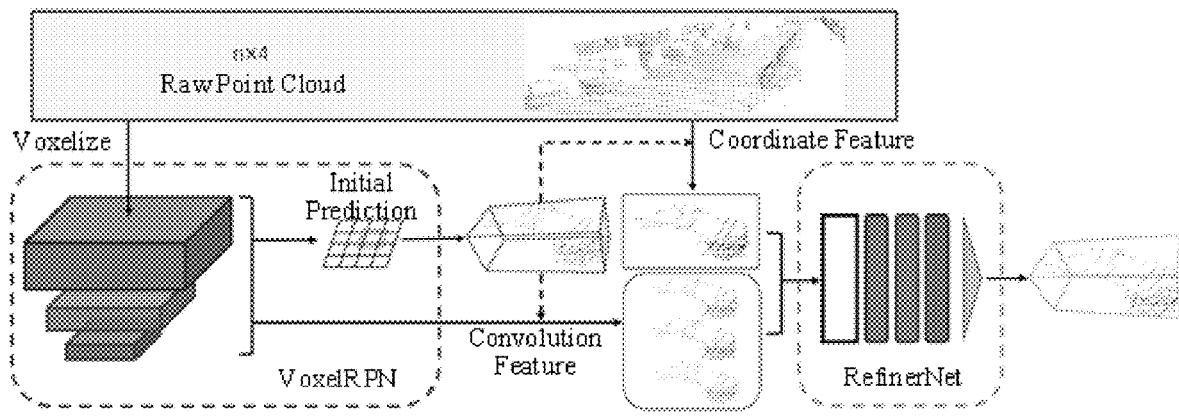
FIG. 2b is an architectural diagram of object detection according to an embodiment of this application.

For example, referring to FIG. 2b, a point cloud represented by an n×4 vector may be obtained. n is the number of points in the point cloud. Each point corresponds to one 1×4 4D vector. Dimensions of the vector correspond to the 3D coordinates and a reflection intensity.

202. The electronic device maps the point cloud to a 3D voxel representation, to obtain feature information of a 3D voxel.

For example, the electronic device constructs a voxel block (for example, a cubic voxel block) of a corresponding size based on a range of the point cloud of the scene; divides the voxel block to obtain a plurality of 3D voxels; maps the point cloud of the scene to the 3D voxels; and constructs feature information of the 3D voxels based on location information of mapping points in the 3D voxels.

For example, referring to FIG. 2b, the point cloud may be voxelized, to map the n×4 vector into a 3D voxel (L×W× H×4) representation. In one embodiment, a range of a 3D scene is determined, a voxel block is constructed, and the voxel block is divided into a plurality of voxel representations. Points are then mapped into the voxels without other complex operations, a 4D vector of a mapping point is directly selected from a voxel including mapping points as a feature of the voxel, and a feature of a voxel including no mapping point is 0.

203. The electronic device performs a 3D convolution operation and a 2D convolution operation on the feature information of the 3D voxel sequentially to obtain a convolution feature set.

For example, referring to FIG. 2b, after the feature information of the 3D voxel is obtained, the feature information may be inputted into a VoxelRPN as a voxel input. For example, referring to the RPN shown in FIG. 1c, 800×704×20×4 (that is, L×W×H×4) 3D feature information may be inputted into the VoxelRPN.

The VoxelRPN includes a plurality of BLOCKs (convolution units or convolutional blocks performing a convolution operation). Referring to FIG. 1c, the VoxelRPN includes a BLOCK1, a BLOCK2, a BLOCK3, and a BLOCK4; a 3D convolution operation is performed on the feature information of the 3D voxel by using a 3D convolution layer (Conv3D) in the BLOCK1, and weighted 3D convolution feature information is inputted into the BLOCK2, to perform a 2D convolution operation on the weighted 3D convolution feature information by using 2D convolution layers (Conv2Ds) in the BLOCK2, the BLOCK3, and the BLOCK4. A deconvolution operation is then performed on convolution features outputted by the BLOCK4 and the BLOCK3, to make deconvolution features outputted by the BLOCK4 and the BLOCK3 and a convolution feature outputted by the BLOCK2 to be of the same size, and the features outputted by the BLOCK2, the BLOCK3, and the BLOCK4 are fused by using a fusion module to obtain a convolution feature set such as a feature map.

For operations of the convolution feature set, reference may be made to the descriptions of the various embodiments.

204. The electronic device predicts positioning offset information and an object category corresponding to the 3D voxel based on the convolution feature set, the positioning offset information being initial positioning offset information of a reference object region corresponding to the 3D voxel relative to an actual object region.

For example, referring to FIG. 2b and FIG. 1c, after obtaining the convolution feature set, regression and classification may be performed respectively by using a regression network (reg) and a classification network (cls) in the VoxelRPN.

The classification network (cls) is configured to predict an object category based on the convolution feature set; and the regression network (reg) is configured to predict positioning offset information of a reference object region (anchor) relative to an actual object region based on the convolution feature set, for example, offsets of 7D regression parameters (x, y, z, h, w, l, and theta).

For example, parameter offsets of an anchor box (that is, a reference box) relative to a ground truth may be predicted by using the regression network, such as offsets of the 7D regression parameters (x, y, z, h, w, l, and theta).

205. The electronic device adjusts the reference object region based on the initial positioning offset information and the object category to obtain initial positioning information of a candidate object region.

For example, the electronic device screens the reference object region according to the object category to obtain a screened object region; and corrects positioning information of the screened object region based on initial positioning offset information of the screened object region to obtain the initial positioning information of the candidate object region.

For example, referring to FIG. 2b, after the positioning parameter offsets and category of the anchor box are predicted by using the VoxelRPN, the anchor box may be screened based on the category, and a screened anchor box may be corrected based on the positioning parameter offsets, to obtain a candidate box of initial prediction.

206. The electronic device selects a target point located in the candidate object region from the point cloud, and selects target convolution feature information corresponding to a location of the target point from the convolution feature set.

For example, referring to FIG. 2b and FIG. 1d, after a candidate 3D box is predicted, a point cloud (n×4) in the box may be obtained through cropping from the point cloud by using the 3D box for use as a coordinate feature of the 3D box.

In addition, convolution features of locations corresponding to points in each box are found from the feature map outputted by the VoxelRPN for use as convolution features of the 3D box. The two parts of features are inputted into a RefinerNet structure as inputs.

207. The electronic device fuses location information and the target convolution feature information of the target point to obtain region feature information of the candidate object region.

For example, referring to FIG. 2b and FIG. 1d, after location features and the convolution features are inputted into the RefinerNet, the RefinerNet may fuse the two parts of features to obtain features of the 3D box. In some embodiments, reference may be made to the descriptions of the foregoing embodiments.

208. The electronic device predicts positioning offset information of the candidate object region relative to the actual object region based on the region feature information, to obtain predicted positioning offset information.

For example, referring to FIG. 2b and FIG. 1d, positioning offset prediction may be performed by using the regression network (reg) in the RefinerNet, to obtain positioning offset information of the candidate object region such as a candidate box relative to the actual object region such as a ground truth.

For example, the positioning offset information may include: location offset information (coordinate offsets of the 3D coordinates x, y, and z), size offset information (size offsets of the length, width, and height), angle offset information (for example, an angle offset of the rotation angle), and the like, such as offsets of the 7D parameters (x, y, z, h, w, l, and theta).

209. The electronic device corrects the initial positioning information of the candidate object region based on the predicted positioning offset information, to obtain positioning information of a target object region.

After the predicted positioning offset information of the candidate object region is obtained, the initial positioning information of the candidate object region may be corrected based on the predicted positioning offset information, the candidate object region of which the positioning information has been corrected is used as a target object region, and the corrected positioning information is used as positioning information of the target object region. That is, the target object region and the positioning information are respectively a target object region and positioning information thereof that need to be eventually obtained in this embodiment of this application.

Referring to FIG. 2b, after the RefinerNet predicts the offsets, the 3D box may be corrected based on the predicted offsets, to obtain an eventual precise 3D box and implement object detection.

Figure 2C:
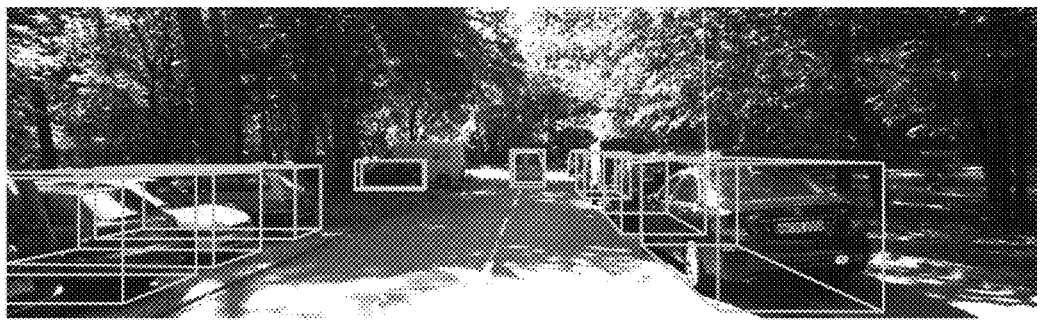
FIG. 2c is a schematic diagram of object detection in an autonomous driving scenario according to an embodiment of this application.

The solution in the embodiments of this application may be applied to the field of autonomous driving, and object detection is implemented by using the method in the embodiments of this application in an autonomous driving process. For example, referring to FIG. 2c, objects such as vehicles and pedestrians in an autonomous driving scenario may be detected by using the object detection method provided in the embodiments of this application.

The embodiments of this application may use point cloud data of a scene to perform object detection, and location information and convolution features of a point cloud are fused, to minimize the loss of positioning information, thereby effectively improving object detection accuracy and efficiency. The solution is especially suitable for 3D object detection. In addition, this solution further uses an RPN and a region RefinerNet to perform object detection, so that object detection efficiency can be greatly improved.

To better implement the foregoing method, correspondingly, an embodiment of this application further provides an object detection apparatus. The object detection apparatus may be integrated in an electronic device, and the electronic device may be a network. The network device may be a server, or may be a device such as a terminal, an in-vehicle device, or an unmanned aerial vehicle, or may be a micro processing box or the like.

Figure 3A:
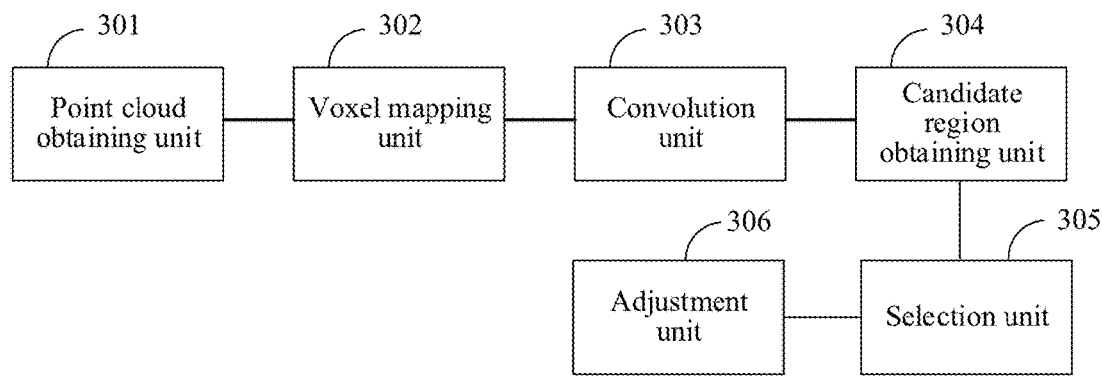
FIG. 3a is a schematic structural diagram of an object detection apparatus according to an embodiment of this application.

For example, as shown in FIG. 3a, the object detection apparatus may include a point cloud obtaining unit 301, a voxel mapping unit 302, a convolution unit 303, a candidate region obtaining unit 304, a selection unit 305, and an adjustment unit 306.

The point cloud obtaining unit 301 is configured to obtain a point cloud of a scene, the point cloud including location information of points.

The voxel mapping unit 302 is configured to map the point cloud to a 3D voxel representation, to obtain feature information of a 3D voxel.

The convolution unit 303 is configured to perform a convolution operation on the feature information of the 3D voxel to obtain a convolution feature set.

The candidate region obtaining unit 304 is configured to determine initial positioning information of a candidate object region based on the convolution feature set.

The selection unit 305 is configured to determine a target point located in the candidate object region in the point cloud.

The adjustment unit 306 is configured to adjust the initial positioning information of the candidate object region based on location information and target convolution feature information of the target point, to obtain positioning information of a target object region, the target convolution feature information being convolution feature information corresponding to a location of the target point in the convolution feature set.

Figure 3B:
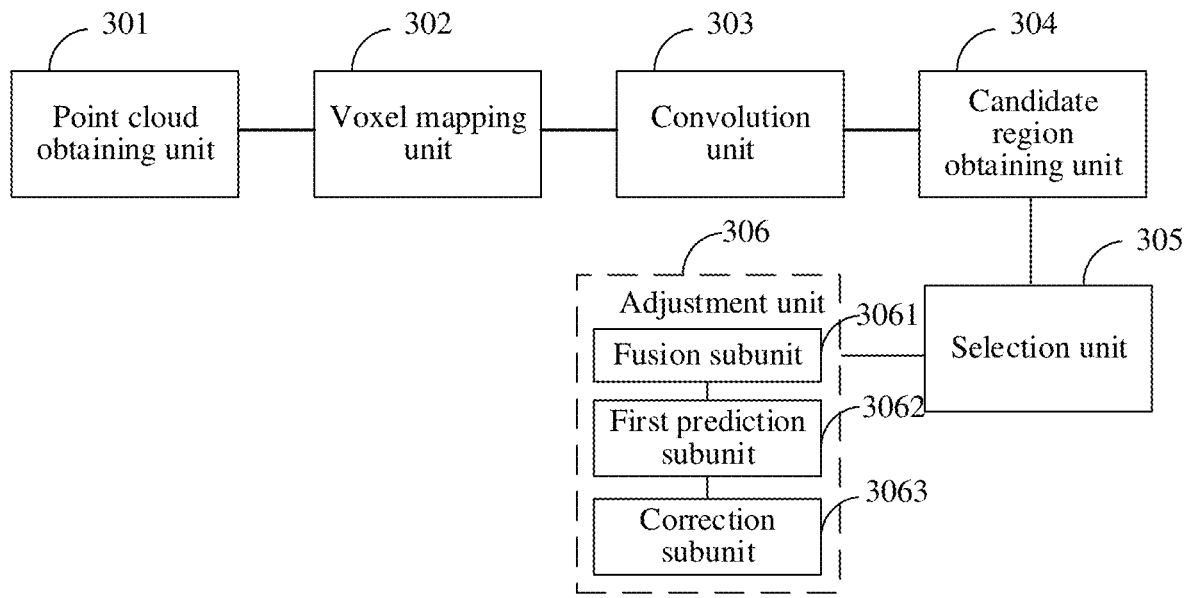
FIG. 3b is another schematic structural diagram of an object detection apparatus according to an embodiment of this application.

In an embodiment, referring to FIG. 3b, the adjustment unit 306 may include:
- a fusion subunit 3061, configured to fuse the location information and the target convolution feature information of the target point to obtain region feature information of the candidate object region;
- a first prediction subunit 3062, configured to predict positioning offset information of the candidate object region relative to an actual object region based on the region feature information, to obtain predicted positioning offset information; and
- a correction subunit 3063, configured to correct the initial positioning information of the candidate object region based on the predicted positioning offset information, to obtain the positioning information of the target object region.

In an embodiment, the fusion subunit 3061 may be configured to:
- fuse the location information and the target convolution feature information of the target point to obtain fused feature information;
- perform dimension reduction on the target convolution feature information of the target point to obtain a feature weight of the target point;
- perform feature weighting on the fused feature information based on the feature weight to obtain weighted feature information; and
- perform a downsampling operation on the weighted feature information to obtain the region feature information of the candidate object region.

In an embodiment, the fusion subunit 3061 may be configured to: perform dimension raising on feature dimensions of the fused feature information to obtain processed feature information; and perform feature weighting on the processed feature information based on the feature weight to obtain the weighted feature information.

In an embodiment, the fusion subunit 3061 may be configured to: perform dimension reduction on the target convolution feature information of the target point to obtain an initial feature weight of the target point; and process the initial feature weight based on an activation function to obtain the feature weight of the target point.

Figure 3C:
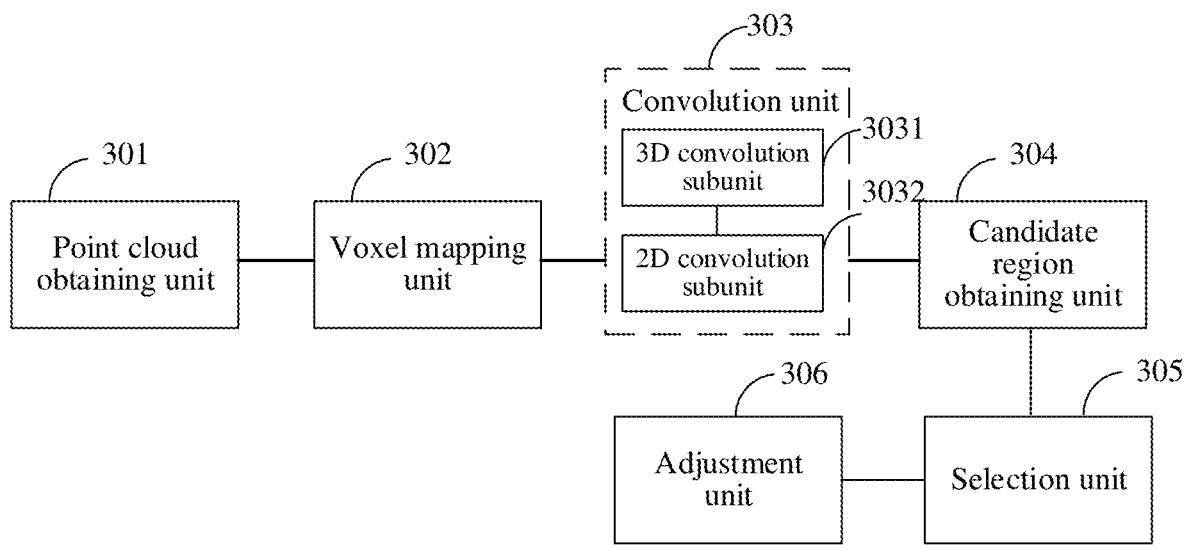
FIG. 3c is another schematic structural diagram of an object detection apparatus according to an embodiment of this application.

In an embodiment, referring to FIG. 3c, the convolution unit 303 may include:
- a 3D convolution subunit 3031, configured to perform a 3D convolution operation on the feature information of the 3D voxel to obtain 3D convolution feature information of the 3D voxel; and
- a 2D convolution subunit 3032, configured to perform a 2D convolution operation on the 3D convolution feature information of the 3D voxel to obtain the convolution feature set.

In an embodiment, the 3D convolution subunit 3031 may be configured to:
- perform the 3D convolution operation on the feature information of the 3D voxel by using a 3D convolutional network in an RPN, the RPN further including a 2D convolutional network connected to the 3D convolutional network, the 2D convolutional network including a plurality of convolutional blocks sequentially connected; and
- the 2D convolution subunit 3032 may be configured to: perform a 2D convolution operation on the 3D convolution feature information sequentially by using the plurality of convolutional blocks in the 2D convolutional network; and fuse convolution features outputted by the convolutional blocks to obtain the convolution feature set.

In an embodiment, the 2D convolution subunit 3032 is configured to: perform a 2D convolution operation on the 3D convolution feature information sequentially by using the convolutional blocks; perform deconvolution processing on the convolution features outputted by other convolutional blocks than the first convolutional block in the 2D convolutional network to obtain deconvolution features of the other convolutional blocks, the deconvolution features and the convolution feature outputted by the first convolutional block being of the same size; and fuse the convolution feature outputted by the first convolutional block and the deconvolution features of the other convolutional blocks to obtain the convolution feature set.

Figure 3D:
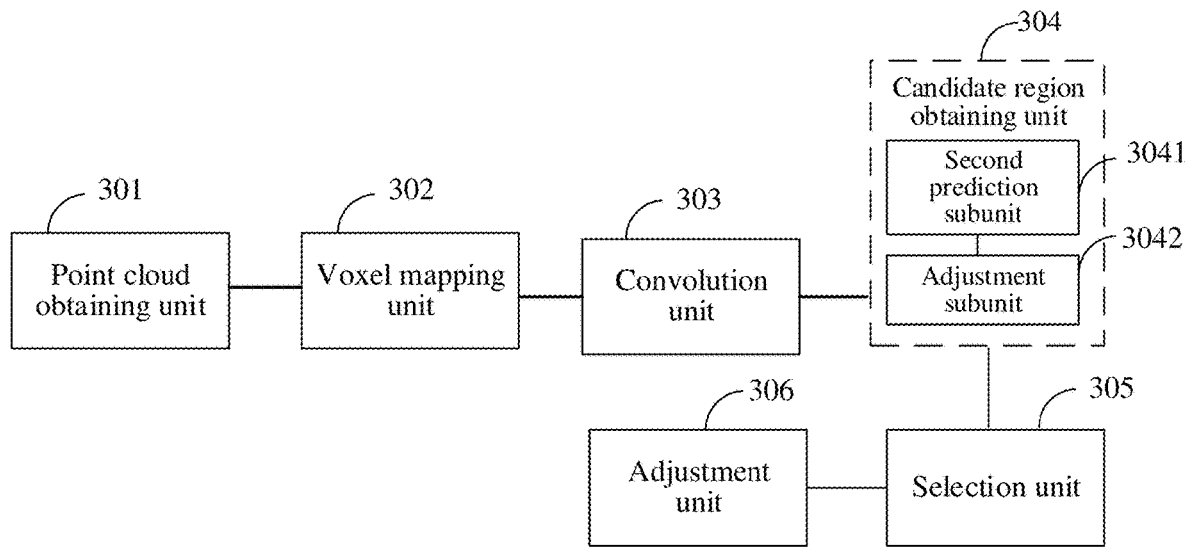
FIG. 3d is another schematic structural diagram of an object detection apparatus according to an embodiment of this application.

In an embodiment, referring to FIG. 3d, the candidate region obtaining unit 304 may include:
- a second prediction subunit 3041, configured to predict positioning offset information and an object category corresponding to the 3D voxel based on the convolution feature set, the positioning offset information being initial positioning offset information of a reference object region corresponding to the 3D voxel relative to an actual object region; and
- an adjustment subunit 3042, configured to adjust the reference object region corresponding to the 3D voxel based on the positioning offset information and the object category to obtain the initial positioning information of the candidate object region.

In an embodiment, the adjustment subunit 3042 may be configured to:
- screen the reference object region according to the object category to obtain a screened object region; and
- correct positioning information of the screened object region based on positioning offset information of the screened object region to obtain the initial positioning information of the candidate object region.

In an embodiment, the convolution unit 303 is configured to:
- perform the 3D convolution operation on the feature information of the 3D voxel by using a 3D convolutional network in an RPN, to obtain 3D convolution feature information of the 3D voxel, the RPN further including a 2D convolutional network connected to the 3D convolutional network, a fusion module, and a classification network and a regression network that are connected to the fusion module, the 2D convolutional network including a plurality of convolutional blocks sequentially connected;
- perform a 2D convolution operation on the 3D convolution feature information sequentially by using the plurality of convolutional blocks in the 2D convolutional network; and
- fuse convolution features outputted by the convolutional blocks in the 2D convolutional network by using the fusion module to obtain the convolution feature set; and
- the second prediction subunit 3041 is configured to: perform object classification on the 3D voxel based on the classification network and the convolution feature set to obtain the object category corresponding to the 3D voxel; and predict the positioning offset information corresponding to the 3D voxel based on the regression network and the convolution feature set.

Figure 3E:
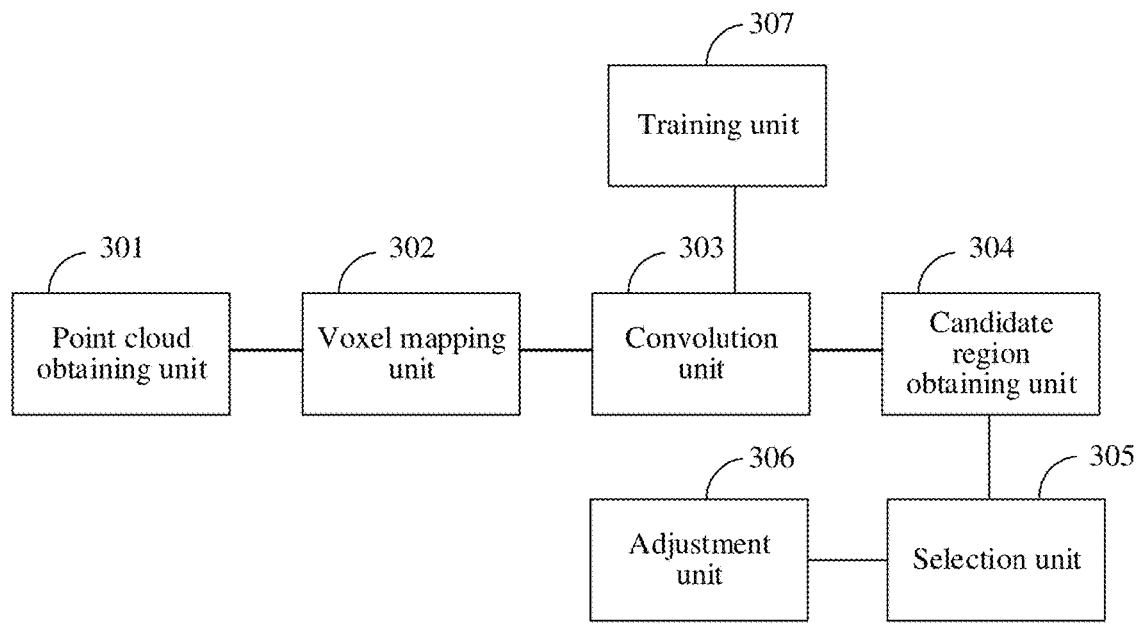
FIG. 3e is another schematic structural diagram of an object detection apparatus according to an embodiment of this application.

In an embodiment, referring to FIG. 3e, the object detection apparatus may further include a training unit 307, and the training unit 307 may be configured to:

obtain a training sample set, the training sample set including a sample point cloud of a sample scene;

map location information of points in the sample point cloud to a sample 3D voxel representation, to obtain sample feature information of a sample 3D voxel;

predict positioning offset information and an object category corresponding to the sample 3D voxel based on a pre-constructed RPN and the sample feature information, to obtain predicted positioning offset information and a predicted category;

calculate a positioning offset loss of the predicted positioning offset information relative to actual offset information;

calculate a category loss of the predicted object category relative to an actual object category; and train the RPN based on the positioning offset loss and the category loss, to obtain a trained RPN.

During specific implementations, the foregoing units may be implemented as independent entities, or may be randomly combined, or may be implemented as the same entity or several entities. For example implementations of the foregoing units, refer to the various embodiments.

As can be learned from the above, the object detection apparatus in this embodiment may obtain a point cloud of a scene by using the point cloud obtaining unit 301, the point cloud including location information of points; the voxel mapping unit 302 maps the point cloud to a 3D voxel representation, to obtain feature information of a 3D voxel; the convolution unit 303 performs a convolution operation on the feature information of the 3D voxel to obtain a convolution feature set; the candidate region obtaining unit 304 determines initial positioning information of a candidate object region based on the convolution feature set; the selection unit 305 is configured to select a target point located in the candidate object region from the point cloud; and the adjustment unit 306 adjusts the initial positioning information of the candidate object region based on location information and target convolution feature information of the target point, to obtain positioning information of a target object region, the target convolution feature information being convolution feature information corresponding to a location of the target point in the convolution feature set. This solution may use point cloud data of a scene to perform object detection, and location information and convolution features of a point cloud are fused, to minimize the loss of positioning information, thereby effectively improving object detection accuracy. This solution is especially suitable for 3D object detection.

Figure 4:
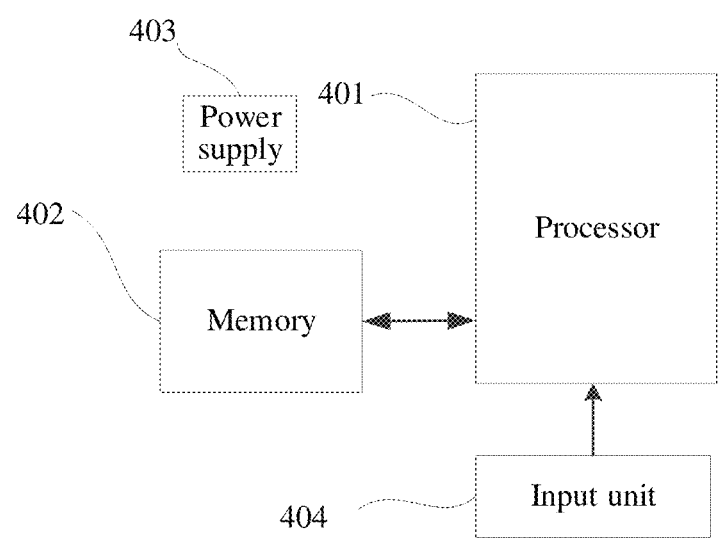
FIG. 4 is a schematic structural diagram of an electronic device according to an embodiment of this application.

In addition, an embodiment of this application further provides an electronic device. FIG. 4 is a schematic structural diagram of an electronic device according to an embodiment of this application.

In one embodiment, the electronic device may include components such as a processor 401 with one or more processing cores, a memory 402 with one or more computer-readable storage media, a power supply 403, and an input unit 404. A person skilled in the art may understand that the electronic device structure shown in FIG. 4 is merely one example embodiment of the electronic device. The electronic device may include more or fewer components than those shown in the figure, or some components may be combined, or a different component deployment may be used.

The processor 401 is a control center of the electronic device, and connects various parts of the entire electronic device by using various interfaces and lines. By running or executing a software program and/or a module stored in the memory 402, and invoking data stored in the memory 402, the processor performs various functions of the electronic device and processes data, thereby performing overall monitoring on the electronic device. Optionally, the processor 401 may include one or more processing cores. Optionally, the processor 401 may integrate an application processor and a modem. The application processor mainly processes an operating system, a user interface, an application program, and the like. The modem mainly processes wireless communication. It may be understood that the foregoing modem may either not be integrated into the processor 401.

The memory 402 may be configured to store a software program and a module, and the processor 401 runs the software program and the module that are stored in the memory 402, to implement various functional applications and data processing. The memory 402 may mainly include a program storage area and a data storage area. The program storage area may store an operating system, an application program required by at least one function (such as a sound playback function and an image display function), and the like. The data storage area may store data created according to use of the electronic device, and the like. In addition, the memory 402 may include a high speed random access memory, and may further include a non-volatile memory, such as at least one magnetic disk storage device, a flash memory, or another volatile solid-state storage device. Correspondingly, the memory 402 may further include a memory controller, to provide access of the processor 401 to the memory 402.

The electronic device further includes the power supply 403 for supplying power to the components. In one example, the power supply 403 may be logically connected to the processor 401 by using a power management system, thereby implementing functions such as charging, discharging, and power consumption management by using the power management system. The power supply 403 may further include one or more of a direct current or alternating current power supply, a re-charging system, a power failure detection circuit, a power supply converter or inverter, a power supply state indicator, and any other component.

The electronic device may further include the input unit 404. The input unit 404 may be configured to receive inputted numeric or character information and generate keyboard, mouse, joystick, optical, or trackball signal input related to user settings and function control.

Although not shown in the figure, the electronic device may further include a display unit, and the like. In one embodiment, the processor 401 in the electronic device may load executable files corresponding to processes of one or more application programs to the memory 402 according to the following instructions, and the processor 401 runs the application program stored in the memory 402, to implement various functions as follows:

obtaining a point cloud of a scene, the point cloud including location information of points; mapping the point cloud to a 3D voxel representation, to obtain feature information of a 3D voxel; performing a convolution operation on the feature information of the 3D voxel to obtain a convolution feature set; determining initial positioning information of a candidate object region based on the convolution feature set; determining a target point located in the candidate object region in the point cloud; and adjusting the initial positioning information of the candidate object region based on location information and target convolution feature information of the target point, to obtain positioning information of a target object region, the target convolution feature information being convolution feature information corresponding to a location of the target point in the convolution feature set.

For example implementations of the above operations, refer to the various embodiments.

As can be learned from the above, the electronic device in this embodiment obtains a point cloud of a scene, the point cloud including location information of points; maps the point cloud to a 3D voxel representation, to obtain feature information of a 3D voxel; performs a convolution operation on the feature information of the 3D voxel to obtain a convolution feature set; determines initial positioning information of a candidate object region based on the convolution feature set; determines a target point located in the candidate object region in the point cloud; and adjusts the initial positioning information of the candidate object region based on location information and target convolution feature information of the target point, to obtain positioning information of a target object region, the target convolution feature information being convolution feature information corresponding to a location of the target point in the convolution feature set. This solution may use point cloud data of a scene to perform object detection, and location information and convolution features of a point cloud are fused, to minimize the loss of positioning information, thereby effectively improving object detection accuracy. This solution is especially suitable for 3D object detection.

A person of ordinary skill in the art may understand that, all or some steps of the methods in the foregoing embodiments may be implemented by using instructions, or implemented through instructions controlling relevant hardware, and the instructions may be stored in a computer-readable storage medium and loaded and executed by a processor.

Accordingly, an embodiment of this application further provides a storage medium, storing a plurality of instructions, the instructions being capable of being loaded by a processor, to perform steps in any object detection method according to the embodiments of this application. For example, the instructions may perform the following steps: obtaining a point cloud of a scene, the point cloud including location information of points; mapping the point cloud to a 3D voxel representation, to obtain feature information of a 3D voxel; performing a convolution operation on the feature information of the 3D voxel to obtain a convolution feature set; determining initial positioning information of a candidate object region based on the convolution feature set; determining a target point located in the candidate object region in the point cloud; and adjusting the initial positioning information of the candidate object region based on location information and target convolution feature information of the target point, to obtain positioning information of a target object region, the target convolution feature information being convolution feature information corresponding to a location of the target point in the convolution feature set.

For example implementations of the above operations, refer to the foregoing various embodiments.

The storage medium may include a read-only memory (ROM), a random access memory (RAM), a magnetic disk, an optical disc, or the like.

Because the instructions stored in the storage medium may perform the steps of any object detection method provided in the embodiments of this application, the instructions can implement beneficial effects that may be implemented by any object detection method provided in the embodiments of this application. For details, reference may be made to the foregoing various embodiments.

An object detection method and apparatus, an electronic device, and a storage medium provided in the embodiments of this application are described in detail above. The principle and implementations of this application are described herein by using specific examples. The descriptions of the foregoing embodiments are merely used for helping understand the method and core ideas of this application. In addition, a person skilled in the art can make changes to this application in terms of the specific implementations and application scopes according to the ideas of this application. Therefore, the content of this specification shall not be construed as a limitation on this application.

What is claimed is:

1. An object detection method, performed by an electronic device, the method comprising:
    obtaining a point cloud of a scene, the point cloud comprising location information of points;
    mapping the point cloud to a three-dimensional (3D) voxel representation, to obtain feature information of a 3D voxel;
    performing a convolution operation on the feature information of the 3D voxel to obtain a convolution feature set;
    determining initial positioning information of a candidate object region based on the convolution feature set;
    determining a target point located in the candidate object region in the point cloud; and
    adjusting the initial positioning information of the candidate object region based on location information and target convolution feature information of the target point, wherein to obtain positioning information of a target object region, the target convolution feature information is convolution feature information corresponding to a location of the target point in the convolution feature set,
    wherein the adjusting further comprises:
        fusing the location information and the target convolution feature information of the target point to obtain region feature information of the candidate object region;
        predicting positioning offset information of the candidate object region relative to an actual object region based on the region feature information, to obtain predicted positioning offset information; and
        correcting the initial positioning information of the candidate object region based on the predicted positioning offset information, to obtain the positioning information of the target object region.

2. The object detection method according to claim 1, wherein the fusing further comprises:
    fusing the location information and the target convolution feature information of the target point to obtain fused feature information;
    performing dimension reduction on the target convolution feature information to obtain a feature weight of the target point;
    performing feature weighting on the fused feature information based on the feature weight to obtain weighted feature information; and
    performing a downsampling operation on the weighted feature information to obtain the region feature information of the candidate object region.

3. The object detection method according to claim 2, wherein the performing feature weighting on the fused feature information further comprises:
  performing dimension raising on feature dimensions of the fused feature information to obtain processed feature information; and
  performing feature weighting on the processed feature information based on the feature weight to obtain the weighted feature information.

4. The object detection method according to claim 2, wherein the performing dimension reduction on the target convolution feature information further comprises:
  performing dimension reduction on the target convolution feature information to obtain an initial feature weight; and
  processing the initial feature weight based on an activation function to obtain the feature weight of the target point.

5. The object detection method according to claim 1, wherein the performing a convolution operation on the feature information further comprises:
  performing a 3D convolution operation on the feature information of the 3D voxel to obtain 3D convolution feature information of the 3D voxel; and
  performing a two-dimensional (2D) convolution operation on the 3D convolution feature information to obtain the convolution feature set.

6. The object detection method according to claim 5, wherein the performing a 3D convolution operation on the feature information of the 3D voxel comprises:
  performing the 3D convolution operation on the feature information of the 3D voxel by using a 3D convolutional network in a region proposal network (RPN), the RPN further comprising a 2D convolutional network connected to the 3D convolutional network, the 2D convolutional network comprising a plurality of convolutional blocks sequentially connected; and
  the performing a 2D convolution operation on the 3D convolution feature information to obtain the convolution feature set comprises:
    performing a 2D convolution operation on the 3D convolution feature information sequentially by using the plurality of convolutional blocks in the 2D convolutional network; and
    fusing convolution features outputted by the convolutional blocks to obtain the convolution feature set.

7. The object detection method according to claim 6, wherein the fusing convolution features outputted by the convolutional blocks further comprises:
  performing deconvolution processing on the convolution features outputted by other convolutional blocks than the first convolutional block in the 2D convolutional network to obtain deconvolution features of the other convolutional blocks, the deconvolution features and the convolution feature outputted by the first convolutional block being of the same size; and
  fusing the convolution feature outputted by the first convolutional block and the deconvolution features of the other convolutional blocks to obtain the convolution feature set.

8. The object detection method according to claim 1, wherein the determining initial positioning information further comprises:
  predicting positioning offset information and an object category corresponding to the 3D voxel based on the convolution feature set, the positioning offset information being initial positioning offset information of a reference object region corresponding to the 3D voxel relative to an actual object region; and
  adjusting the reference object region corresponding to the 3D voxel based on the positioning offset information and the object category to obtain the initial positioning information of the candidate object region.

9. The object detection method according to claim 8, wherein the adjusting the reference object region further comprises:
  screening the reference object region according to the object category to obtain a screened object region; and
  correcting positioning information of the screened object region based on positioning offset information of the screened object region to obtain the initial positioning information of the candidate object region.

10. The object detection method according to claim 1, wherein the performing a convolution operation on the feature information further comprises:
  performing the 3D convolution operation on the feature information of the 3D voxel by using a 3D convolutional network in a region proposal network (RPN), to obtain 3D convolution feature information of the 3D voxel, the RPN further comprising a two-dimensional (2D) convolutional network connected to the 3D convolutional network, a fusion module, and a classification network and a regression network that are connected to the fusion module, the 2D convolutional network comprising a plurality of convolutional blocks sequentially connected;
  performing, sequentially, a 2D convolution operation on the 3D convolution feature information by using the plurality of convolutional blocks in the 2D convolutional network; and
  fusing convolution features outputted by the convolutional blocks in the 2D convolutional network by using the fusion module to obtain the convolution feature set; and
  the predicting positioning offset information and an object category corresponding to the 3D voxel based on the convolution feature set comprises:
    performing object classification on the 3D voxel based on the classification network and the convolution feature set to obtain the object category corresponding to the 3D voxel; and
    predicting the positioning offset information corresponding to the 3D voxel based on the regression network and the convolution feature set.

11. The object detection method according to claim 10, further comprising:
  obtaining a training sample set, the training sample set comprising a sample point cloud of a sample scene;
  mapping location information of points in the sample point cloud to a sample 3D voxel representation, to obtain sample feature information of a sample 3D voxel;
  predicting positioning offset information and an object category corresponding to the sample 3D voxel based on a pre-constructed RPN and the sample feature information, to obtain predicted positioning offset information and a predicted category;
  calculating a positioning offset loss of the predicted positioning offset information relative to actual offset information;
  calculating a category loss of the predicted object category relative to an actual object category; and
  training the RPN based on the positioning offset loss and the category loss, to obtain a trained RPN.

12. An object detection apparatus, comprising:
one or more processors;
a non-transitory computer readable memory in communication with the one or more processors storing instructions thereon, the instructions, when executed by the one or more processors, configure the one or more processors to:
  obtain a point cloud of a scene, the point cloud comprising location information of points;
  map the point cloud to a three-dimensional (3D) voxel representation and configured to obtain feature information of a 3D voxel;
  perform a convolution operation on the feature information of the 3D voxel to obtain a convolution feature set;
  determine initial positioning information of a candidate object region based on the convolution feature set;
  determine a target point located in the candidate object region in the point cloud; and
  adjust the initial positioning information of the candidate object region based on location information and target convolution feature information of the target point and configured to obtain positioning information of a target object region, wherein the target convolution feature information is convolution feature information corresponding to a location of the target point in the convolution feature set,
wherein the adjustment unit further comprises:
  fuse the location information and the target convolution feature information of the target point to obtain region feature information of the candidate object region;
  predict positioning offset information of the candidate object region relative to an actual object region based on the region feature information, to obtain predicted positioning offset information; and
  correct the initial positioning information of the candidate object region based on the predicted positioning offset information, to obtain the positioning information of the target object region.

13. The object detection apparatus according to claim 12, wherein the instructions further configure the one or more processor to:
  fuse the location information and the target convolution feature information of the target point to obtain fused feature information;
  perform dimension reduction on the target convolution feature information to obtain a feature weight of the target point;
  perform feature weighting on the fused feature information based on the feature weight to obtain weighted feature information; and
  perform a downsampling operation on the weighted feature information to obtain the region feature information of the candidate object region.

14. The object detection apparatus according to claim 13, wherein the instructions further configure the one or more processor to:
  perform dimension raising on feature dimensions of the fused feature information to obtain processed feature information; and
  perform feature weighting on the processed feature information based on the feature weight to obtain the weighted feature information.

15. The object detection apparatus according to claim 13, wherein the instructions further configure the one or more processor to:
  perform dimension reduction on the target convolution feature information to obtain an initial feature weight; and
  process the initial feature weight based on an activation function to obtain the feature weight of the target point.

16. The object detection apparatus according to claim 12, wherein the instructions further configure the one or more processor to:
  perform a 3D convolution operation on the feature information of the 3D voxel to obtain 3D convolution feature information of the 3D voxel; and
  perform a 2D convolution operation on the 3D convolution feature information to obtain the convolution feature set.

17. The object detection apparatus according to claim 16, wherein the instructions further configure the one or more processor to:
  perform the 3D convolution operation on the feature information of the 3D voxel by using a 3D convolutional network in a region proposal network (RPN), the RPN further comprising a 2D convolutional network connected to the 3D convolutional network, the 2D convolutional network comprising a plurality of convolutional blocks sequentially connected;
  perform a 2D convolution operation on the 3D convolution feature information sequentially by using the plurality of convolutional blocks in the 2D convolutional network; and
  fuse convolution features outputted by the convolutional blocks to obtain the convolution feature set.

18. The object detection apparatus according to claim 17, wherein the instructions further configure the one or more processor to:
  perform deconvolution processing on the convolution features outputted by other convolutional blocks than the first convolutional block in the 2D convolutional network to obtain deconvolution features of the other convolutional blocks, the deconvolution features and the convolution feature outputted by the first convolutional block being of the same size; and
  fuse the convolution feature outputted by the first convolutional block and the deconvolution features of the other convolutional blocks to obtain the convolution feature set.

19. The object detection apparatus according to claim 12, instructions further configure the one or more processor to:
  predict positioning offset information and an object category corresponding to the 3D voxel based on the convolution feature set, the positioning offset information being initial positioning offset information of a reference object region corresponding to the 3D voxel relative to an actual object region; and
  adjust the reference object region based on the positioning offset information and the object category to obtain the initial positioning information of the candidate object region.

20. The object detection apparatus according to claim 19, instructions further configure the one or more processor to:
  screen the reference object region according to the object category to obtain a screened object region; and
  correct positioning information of the screened object region based on positioning offset information of the screened object region to obtain the initial positioning information of the candidate object region.

21. The object detection apparatus according to claim 20, wherein the instructions further configure the one or more processor to:

perform the 3D convolution operation on the feature information of the 3D voxel by using a 3D convolutional network in a region proposal network (RPN), to obtain 3D convolution feature information of the 3D voxel, the RPN further comprising a two-dimensional (2D) convolutional network connected to the 3D convolutional network, a fusion module, and a classification network and a regression network that are connected to the fusion module, the 2D convolutional network comprising a plurality of convolutional blocks sequentially connected;

perform a 2D convolution operation on the 3D convolution feature information sequentially by using the plurality of convolutional blocks in the 2D convolutional network;

fuse convolution features outputted by the convolutional blocks in the 2D convolutional network by using the fusion module to obtain the convolution feature set;

perform object classification on the 3D voxel based on the classification network and the convolution feature set to obtain the object category corresponding to the 3D voxel; and predict the positioning offset information corresponding to the 3D voxel based on the regression network and the convolution feature set.

22. The object detection apparatus according to claim 21, wherein the instructions further configure the one or more processor to:

obtain a training sample set, the training sample set comprising a sample point cloud of a sample scene;

map location information of points in the sample point cloud to a sample 3D voxel representation, to obtain sample feature information of a sample 3D voxel;

predict positioning offset information and an object category corresponding to the sample 3D voxel based on a pre-constructed RPN and the sample feature information, to obtain predicted positioning offset information and a predicted category;

calculate a positioning offset loss of the predicted positioning offset information relative to actual offset information;

calculate a category loss of the predicted object category relative to an actual object category; and train the RPN based on the positioning offset loss and the category loss, to obtain a trained RPN.

23. A non-transitory, computer-readable storage medium containing instructions thereon, the instructions, when run on a computer, configure the computer to perform the following operations comprising:

obtaining a point cloud of a scene, the point cloud comprising location information of points;

mapping the point cloud to a three-dimensional (3D) voxel representation, to obtain feature information of a 3D voxel;

performing a convolution operation on the feature information of the 3D voxel to obtain a convolution feature set;

determining initial positioning information of a candidate object region based on the convolution feature set;

determining a target point located in the candidate object region in the point cloud; and adjusting the initial positioning information of the candidate object region based on location information and target convolution feature information of the target point, wherein to obtain positioning information of a target object region, the target convolution feature information is convolution feature information corresponding to a location of the target point in the convolution feature set, wherein the adjusting further comprises:
fusing the location information and the target convolution feature information of the target point to obtain region feature information of the candidate object region;

predicting positioning offset information of the candidate object region relative to an actual object region based on the region feature information, to obtain predicted positioning offset information; and correcting the initial positioning information of the candidate object region based on the predicted positioning offset information, to obtain the positioning information of the target object region.

24. The non-transitory, computer-readable storage medium according to claim 23, wherein the performing a convolution operation on the feature information further comprises:

performing a 3D convolution operation on the feature information of the 3D voxel to obtain 3D convolution feature information of the 3D voxel; and performing a two-dimensional (2D) convolution operation on the 3D convolution feature information to obtain the convolution feature set.

25. The non-transitory, computer-readable storage medium according to claim 23, wherein the determining initial positioning information further comprises:

predicting positioning offset information and an object category corresponding to the 3D voxel based on the convolution feature set, the positioning offset information being initial positioning offset information of a reference object region corresponding to the 3D voxel relative to an actual object region; and adjusting the reference object region corresponding to the 3D voxel based on the positioning offset information and the object category to obtain the initial positioning information of the candidate object region.

* * * * *